US010089312B2

(12) United States Patent
Tremblay et al.

(10) Patent No.: US 10,089,312 B2
(45) Date of Patent: *Oct. 2, 2018

(54) METHODS AND APPARATUS FOR POINT CLOUD DATA MANAGEMENT

(71) Applicant: Trimble AB, Danderyd (SE)

(72) Inventors: Guillaume Tremblay, Neuilly Plaisance (FR); Guillaume David, Noisy-le-Grand (FR); Samnang Kheng, Fontenay-sous-Bois (FR)

(73) Assignee: Trimble AB, Danderyd (SE)

( * ) Notice: Subject to any disclaimer, the term of this patent is extended or adjusted under 35 U.S.C. 154(b) by 974 days.

This patent is subject to a terminal disclaimer.

(21) Appl. No.: 14/381,293

(22) PCT Filed: Feb. 26, 2013

(86) PCT No.: PCT/IB2013/000328
§ 371 (c)(1),
(2) Date: Aug. 27, 2014

(87) PCT Pub. No.: WO2013/128264
PCT Pub. Date: Sep. 6, 2013

(65) Prior Publication Data
US 2015/0100555 A1    Apr. 9, 2015

Related U.S. Application Data

(60) Provisional application No. 61/710,718, filed on Oct. 6, 2012, provisional application No. 61/605,244, filed on Mar. 1, 2012.

(51) Int. Cl.
*G06F 17/30*    (2006.01)
*G06T 15/10*    (2011.01)

(52) U.S. Cl.
CPC ...... *G06F 17/3007* (2013.01); *G06F 17/3028* (2013.01); *G06F 17/30091* (2013.01);
(Continued)

(58) Field of Classification Search
CPC ........... G06F 17/3007; G06F 17/30091; G06F 17/30126; G06F 17/30153; G06F 17/3028; G06T 15/10; G06T 2215/16
See application file for complete search history.

(56) References Cited

U.S. PATENT DOCUMENTS

2002/0191844 A1* 12/2002 Lee ................... G06K 9/4652
382/166
2010/0239178 A1* 9/2010 Osher ................... G06T 9/00
382/243
2013/0024545 A1* 1/2013 Sheppard ............... G06T 9/001
709/217

FOREIGN PATENT DOCUMENTS

WO      02/088907 A2    11/2002
WO      03/088085 A1    10/2003
WO      2013/128264 A2   9/2013

OTHER PUBLICATIONS

International Search Report of the International Searching Authority for International Application No. PCT/IB2013/000328 dated Nov. 13, 2013, 4 pages.

* cited by examiner

*Primary Examiner* — Dinku Gebresenbet
(74) *Attorney, Agent, or Firm* — Kilpatrick Townsend & Stockton LLP

(57) ABSTRACT

Methods and apparatus are provided for processing of data representing points in space wherein each is represented by components defining its position in a coordinate system and at least one parameter. For each point, the data are separated into a layer per component, and each component is assigned to a cell of a two-dimensional grid of cells such that corresponding cells of multiple layers contain the components of a point. A component of a point is retrieved by reference to a grid position corresponding to the point and to a layer corresponding to the component. Each layer is
(Continued)

segmented into patches of cells such that a component of a point can be retrieved by reference to a grid position of a patch within a layer and to a grid position of a cell within a patch. A layer is compressed using an associated codec.

19 Claims, 34 Drawing Sheets

(52) U.S. Cl.
CPC .. *G06F 17/30126* (2013.01); *G06F 17/30153* (2013.01); *G06T 15/10* (2013.01); *G06T 2215/16* (2013.01)

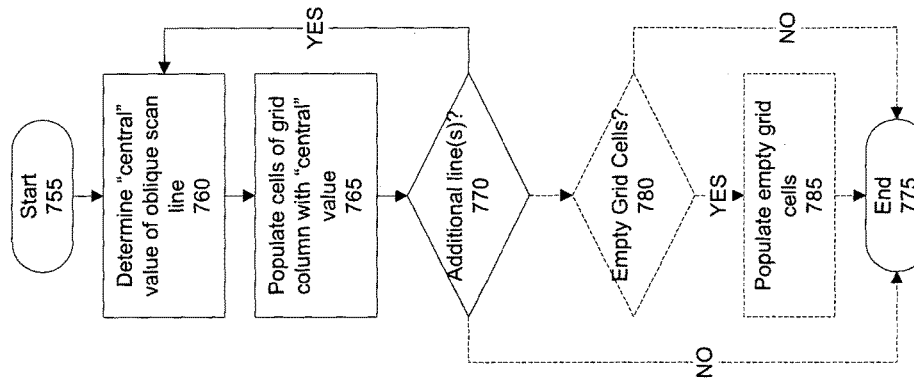
FIG. 7C
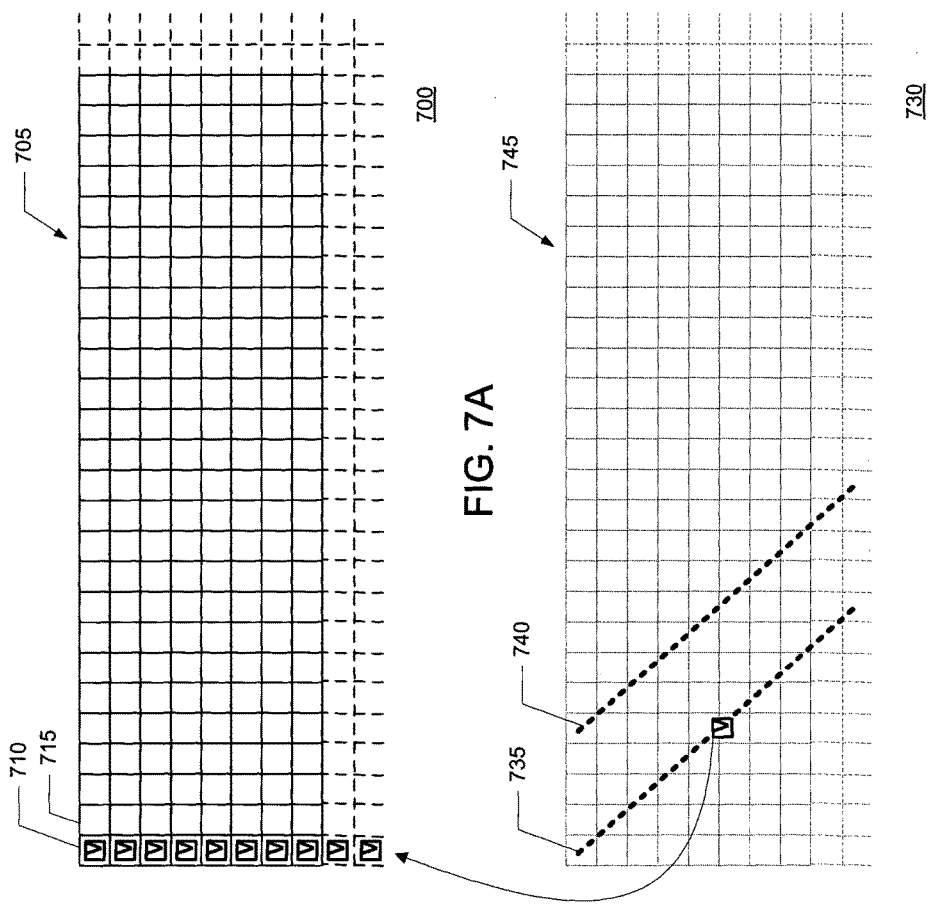
FIG. 7A
FIG. 7B

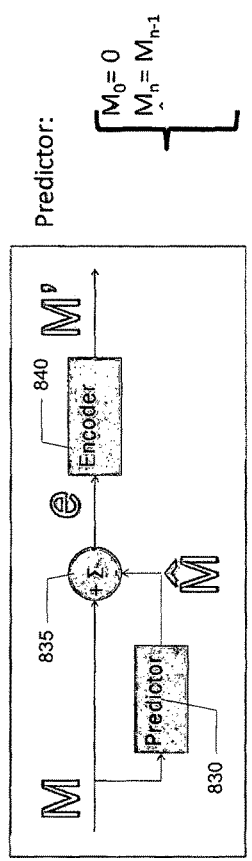
FIG. 8B
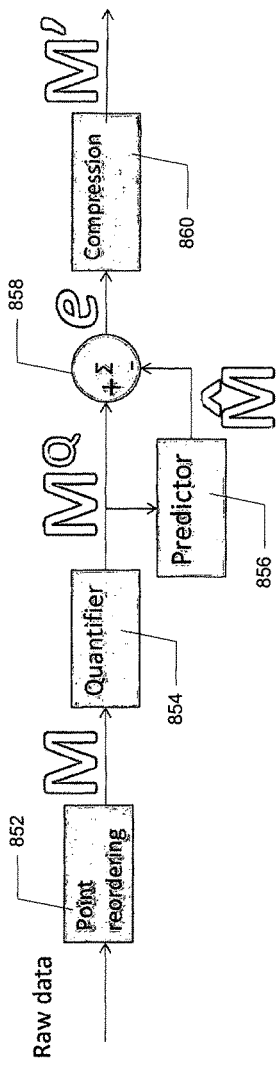
FIG. 8C

```
Uint64 Header-ID = 0x9CB282FC40C502D8
Uint32 Size
Uint32 Version
Float64 Angular-Pixel-Height in radians
Float64 Angular-Pixel-Width in radians
Float64 Vertical-Origin (in radian)
Float64 Horizontal-Origin (in radian)
Uint32 Row-count
Uint32 Column-count
Uint32 Patch-size (side-length, 512 for 512x512 patches)
Uint64 Number-of-valid-scanned-points-inside-the-file
[Registration-Information]
```

Uint32 Codec header version
Uint32 Patch width
Uint32 Patch height
Uint32 Uncompressed data chunk size
Float32 Quantification factor for data in patch
Uint64 Codec ID
Byte Byte Byte Byte Byte Byte Byte ...

FIG. 16B (1605)

Uint64 Header ID: = 0xA76E52DBA1EBD435U
Uint32 Size
Uint32 Version
Uint32 Lookup table count (one per component)
Lookup table 1,
Lookup table 2,
...

FIG. 16C (1610)

Uint32 Component ID
Uint32 Patch count in lookup table = 1
Patch entry 1

```
class TZFScanWriter
{
  public:
    TZFScanWriter(void);
    virtual ~TZFScanWriter(void);

bool CreateNew(const std::wstring& OutFileName, TZZCodecs::CodecFactory& aCodecFactory,
                   const StationParameters& aStationParameters);

bool AddPatch(std::vector<PolarPoint>& aPointVector, unsigned int Line, unsigned int Column);

TZFScanReport EndCreation();
};
```

```
class TZFScanReader
{
public:
    TZFScanReader(void);
    virtual ~TZFScanReader(void);

bool Open(const std::wstring& Filename);
    bool IsOpen(const std::wstring& Filename);
    void Close();

bool GetStationInformation(StationParameters& aStationParameters);
    bool GetStationInformation(StationParameters& aStationParameters, const std::wstring& Filename);

// Patch information
    unsigned int GetPatchNumber();
    unsigned int GetPatchSize();
    unsigned int GetPatchLineNumber();
    unsigned int GetPatchColNumber();

// Point information
    unsigned int GetPointLineNumber();
    unsigned int GetPointColNumber();

bool GetRhoPatch(unsigned int Line, unsigned int Column, std::vector<RhoType>& aPatch);
    bool GetThetaPatch(unsigned int Line, unsigned int Column, std::vector<ThetaType>& aPatch);
    bool GetPhiPatch(unsigned int Line, unsigned int Column, std::vector<PhiType>& aPatch);
    bool GetLumPatch(unsigned int Line, unsigned int Column, std::vector<LumType>& aPatch);
    bool GetLumPatch(unsigned int Line, unsigned int Column, unsigned int& Level, std::vector<LumType>& aPatch);
    bool GetPatch(unsigned int Line, unsigned int Column, std::vector<PolarPoint>& aPatch);

bool GetRhoPatchCompressed(unsigned int Line, unsigned int Column, std::vector<RawDataType>& aPatch,
        CodecGUIDType& aCodecType);
    bool GetThetaPatchCompressed(unsigned int Line, unsigned int Column, std::vector<RawDataType>& aPatch,
        CodecGUIDType& aCodecType);
    bool GetPhiPatchCompressed(unsigned int Line, unsigned int Column, std::vector<RawDataType>& aPatch,
        CodecGUIDType& aCodecType);
    bool GetLumPatchCompressed(unsigned int Line, unsigned int Column, std::vector<RawDataType>& aPatch,
```

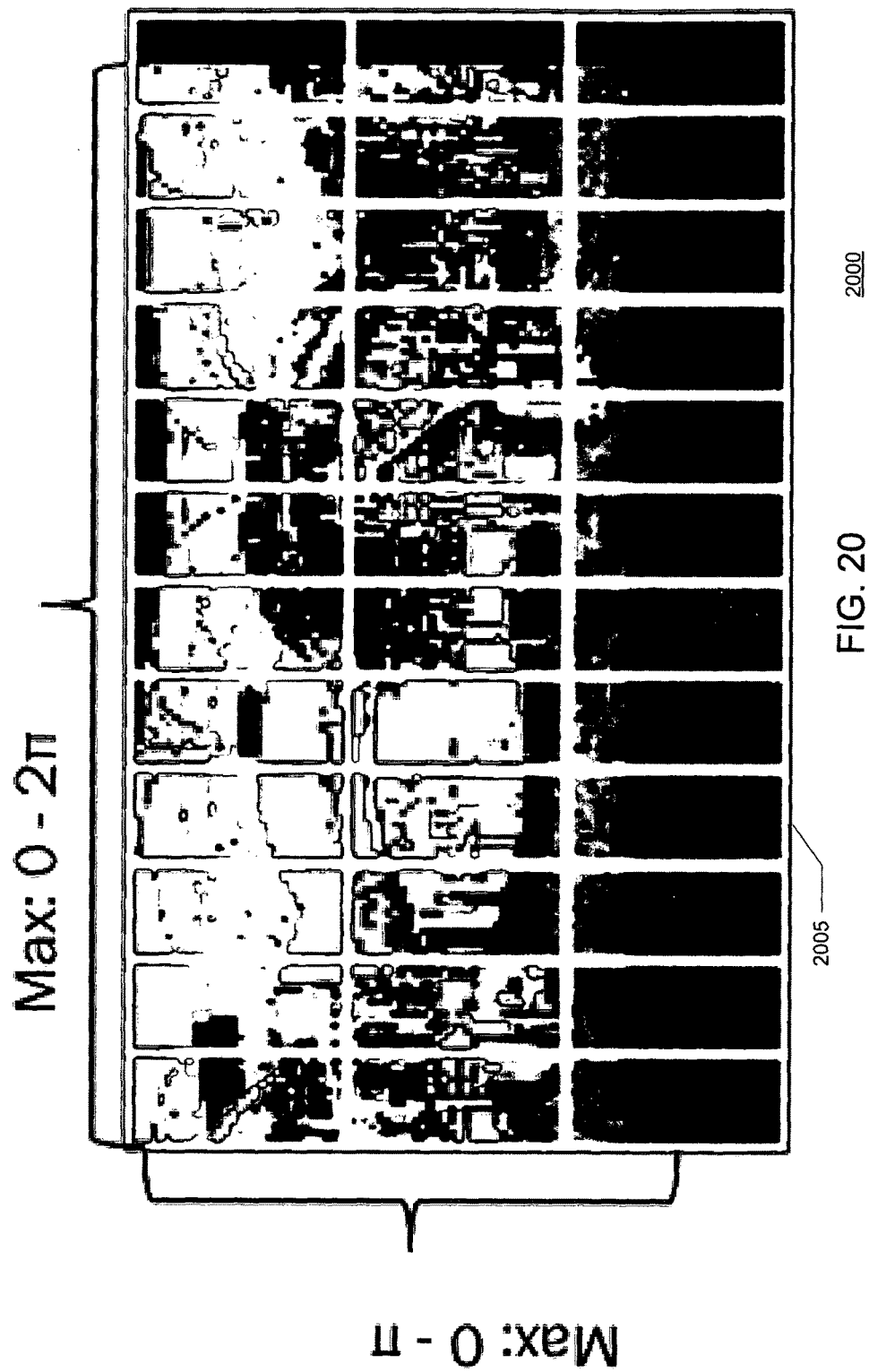

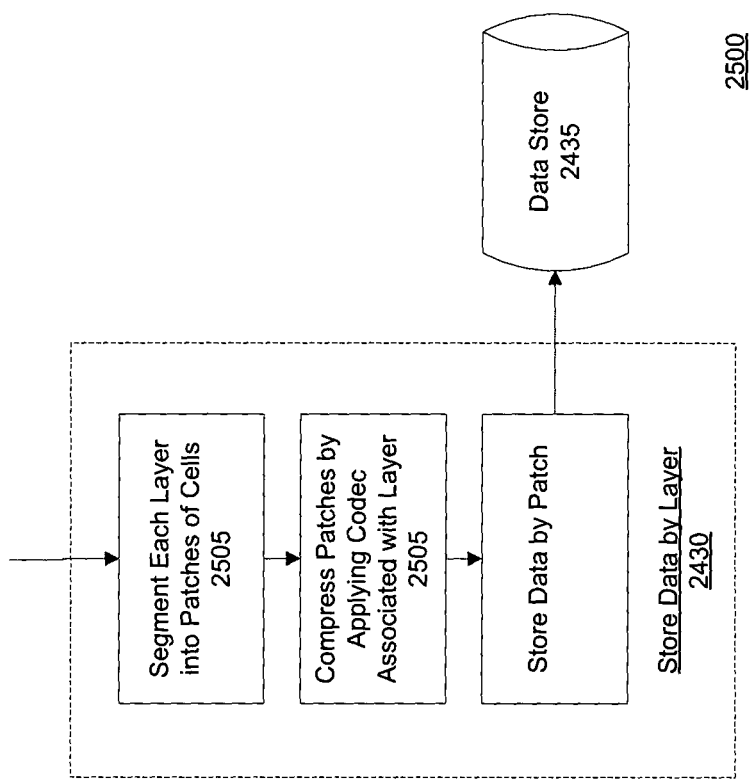

METHODS AND APPARATUS FOR POINT CLOUD DATA MANAGEMENT

CROSS-REFERENCE TO RELATED APPLICATIONS

This application is a U.S. National Stage of PCT Application No. PCT/IB2013/000328, filed Feb. 26, 2013, which claims priority to U.S. Provisional Application No. 61/605,244, filed Mar. 1, 2012 and U.S. Provisional Application No. 61/710,718, filed Oct. 6, 2012, the entire contents of each of which are incorporated herein by reference in their entirety for all purposes.

FIELD OF THE INVENTION

The present invention relates to management of large data files, particularly scanner data representing spatial measurements of a cloud of points.

BACKGROUND

High-speed scanners are commercially available which generate a high-density cloud of point measurements. Such scanners typically have a rotating element which scans a measurement beam about a first axis, mounted on a support which rotates about an orthogonal axis. Each point measurement typically includes a horizontal angle, a vertical angle, a range and a signal intensity. Scanners of this general type include the Trimble Cx Scanner and the Trimble Fx Scanner available from Trimble Navigation Limited of Sunnyvale, Calif., USA.

A single stationary scan involves operating the scanner at a selected location to obtain a set of of point measurements for that location. A project involves performing such a scan at each of multiple locations to obtain data representing a cloud of points for a three-dimensional environment of interest. A user may perform, for example, some fifty scans per day with such a scanner. A typical project can include 200 to 2000 or more scans. Each scan typically includes between 50-150 million point measurements. A single project of 200 scans each having 100 million point measurements, for example, would produce data representing some 20 giga-points. Projects of 7000 scans are already known, and even larger projects are expected in future.

The huge size of these data sets raises a number of issues. First, is how to store and transfer the data from the project site where the data is collected to an office environment where the data are needed. The currently preferred method is to store the data on a physical storage medium, such as a hard drive, and to ship this medium by post or courier. Streaming of such large data sets is generally impractical.

Second, is how to process the data. Special processing algorithms, such as are used to extract useful information from the raw point-measurement data, are slow due to the large quantity of data to be manipulated and the sequential structure of the acquired data set.

Third, is how to present the data so they can be visualized. Visualization is needed in the field for quality assurance so the scanner operator can assure the collected data set is good, as well as in the office where the data are used.

Fourth, is how to recover when a scan is interrupted before, completion, such as when battery power is lost during a scan, so that already-acquired data are not lost.

Improved methods and apparatus for managing such point cloud data are needed to address one or more of these and other issues.

SUMMARY

Methods and apparatus in accordance with some embodiments of the invention provide for processing of data representing points in space wherein each point is represented by at least three components defining its position in a non-Cartesian coordinate system and at least one component defining a parameter of the point.

For each point, the components are separated into a respective layer per component, and each component is assigned to a cell of a two-dimensional grid of cells such that corresponding cells of multiple layers contain the components representing the point. Each layer is stored.

A selected component of a point can be retrieved by reference to a grid position corresponding to the point and to a layer corresponding to the component.

In some embodiments, a stored layer is segmented into patches of cells such that a selected component of a point can be retrieved by reference to a grid position of a patch within a layer and to a grid position of a cell within a patch.

In some embodiments, a stored layer is compressed by applying a codec associated with the layer. In some embodiments, the codec encodes a derivative of the component assigned to a cell. In some embodiments, the codec associated with a layer comprises a range codec associated with a layer representing range, an angle codec associated with a layer representing an angle, or an intensity codec associated with a layer representing intensity.

In some embodiments, the non-Cartesian coordinate system comprises a spherical coordinate system in which position of a point is defined by two angles about an origin and a range from the origin.

In some embodiments, the non-Cartesian coordinate system comprises a swath coordinate system in which position of a point is defined by a longitudinal displacement along a path, a sweep angle across the path, and a range from a point along the path.

In some embodiments, the non-Cartesian coordinate system comprises time-based coordinates. In some embodiments, the non-Cartesian coordinate system comprises a system in which values increase continuously or cyclically.

In some embodiments, storage and transfer are aided with data compression by layer and patch. In some embodiments, processing is simplified by segmentation of the data in layers and patches. In some embodiments, visualization is facilitated by segmentation so that relevant data can be selected by patch and layer. In some embodiments, recovery of an interrupted scan is enabled by storing data in a grid structure as measurement data are acquired.

In some embodiments, a single data format is used to store data in the field and in the office, without conversion between a field format and an office format.

In some embodiments, the data format is extensible and scalable to handle data sets representing, for example, billions of three-dimensional point measurements.

In some embodiments, the data format has no inherent limit as to time or space or components.

BRIEF DESCRIPTION OF THE DRAWING

These and other aspects of the invention are described below with reference to the drawing figures, in which:

FIG. 7A shows an example of a portion of a regular grid of cells to be populated;

FIG. 7B shows an example of oblique scan lines overlaid on a portion of a grid;

FIG. 7C shows a process for populating a grid using point-scan values of a scan having oblique scan lines;

FIG. 8B shows an example of a codec;

FIG. 8C shows an example of the coder side of a codec;

FIG. 12D shows an example of a scan information structure in accordance with some embodiments of the invention;

FIG. 16A shows an example of a data previews structure in accordance with some embodiments of the invention;

FIG. 16B shows an example of a data previews lookup tables structure in accordance with some embodiments of the invention;

FIG. 16C shows an example of a data previews structure in accordance with some embodiments of the invention;

FIG. 16D shows an example of an application programming interface (API) for writing data to a data structure in accordance with some embodiments of the invention;

FIG. 16E shows an example of an application programming interface (API) for reading data from a data structure in accordance with some embodiments of the invention;

FIG. 20 illustrates a cloud of three-dimensional points 2005 displayed in a grid structure;

FIG. 25 shows a detailed configuration of step 2440 in accordance with some embodiments of the invention.

DETAILED DESCRIPTION

Figure 1:
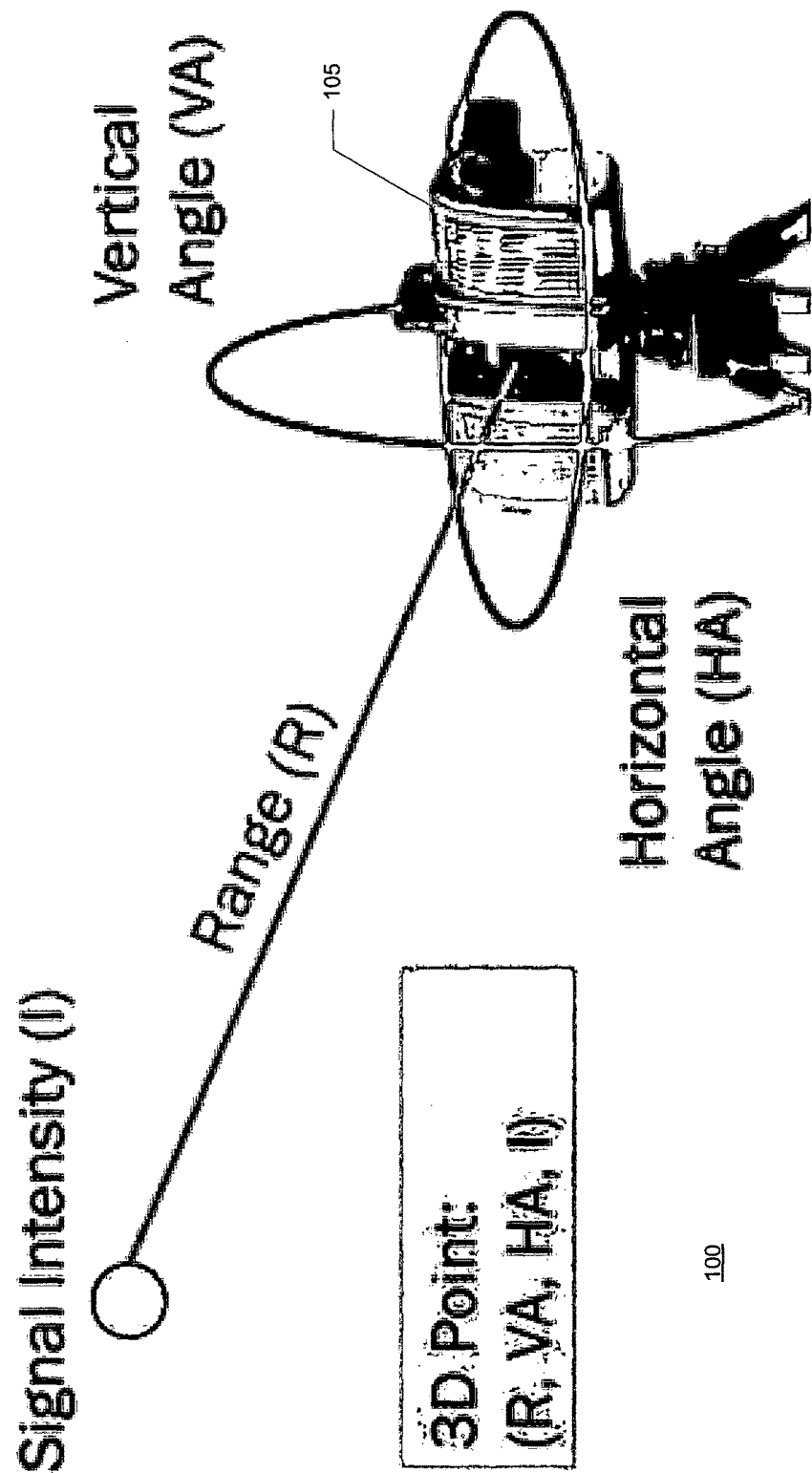
FIG. 1 illustrates acquisition of three-dimensional point measurements with a scanner.

FIG. 1 illustrates at 100 how three-dimensional point measurements are acquired with a scanner, such as a Trimble Cx or a Trimble Fx scanner. For each point, a scanner 105 measures a horizontal angle (HA), a vertical angle (VA), a range (R), and a signal intensity (I), such that each 3D point is represented by the measurement set (R, VA, HA, I).

The data set acquired from a scan with such a scanner is typically too large to store in the scanner's random-access memory (RAM) and therefore is not practical to use as a single data structure.

Figure 2A:
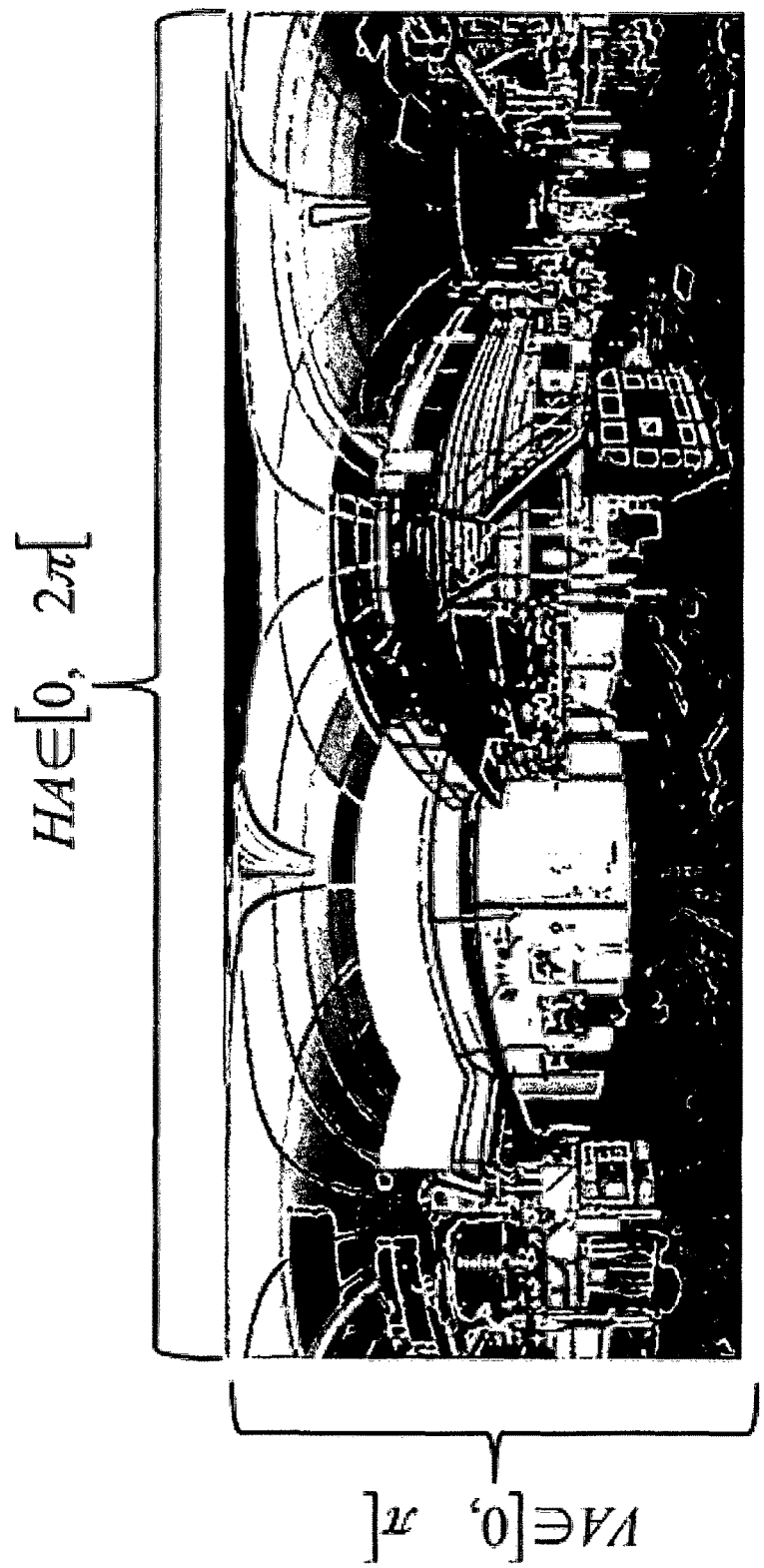
FIG. 2A illustrates scanner data displayed as a cloud of points.

FIG. 2A illustrates at 200 an example of scanner data displayed as a cloud of 3D points in a 2D grid structure having a vertical axis $VA \in [0,\pi]$ and a horizontal axis $HA \in [0,2\pi]$.

Figure 2B:
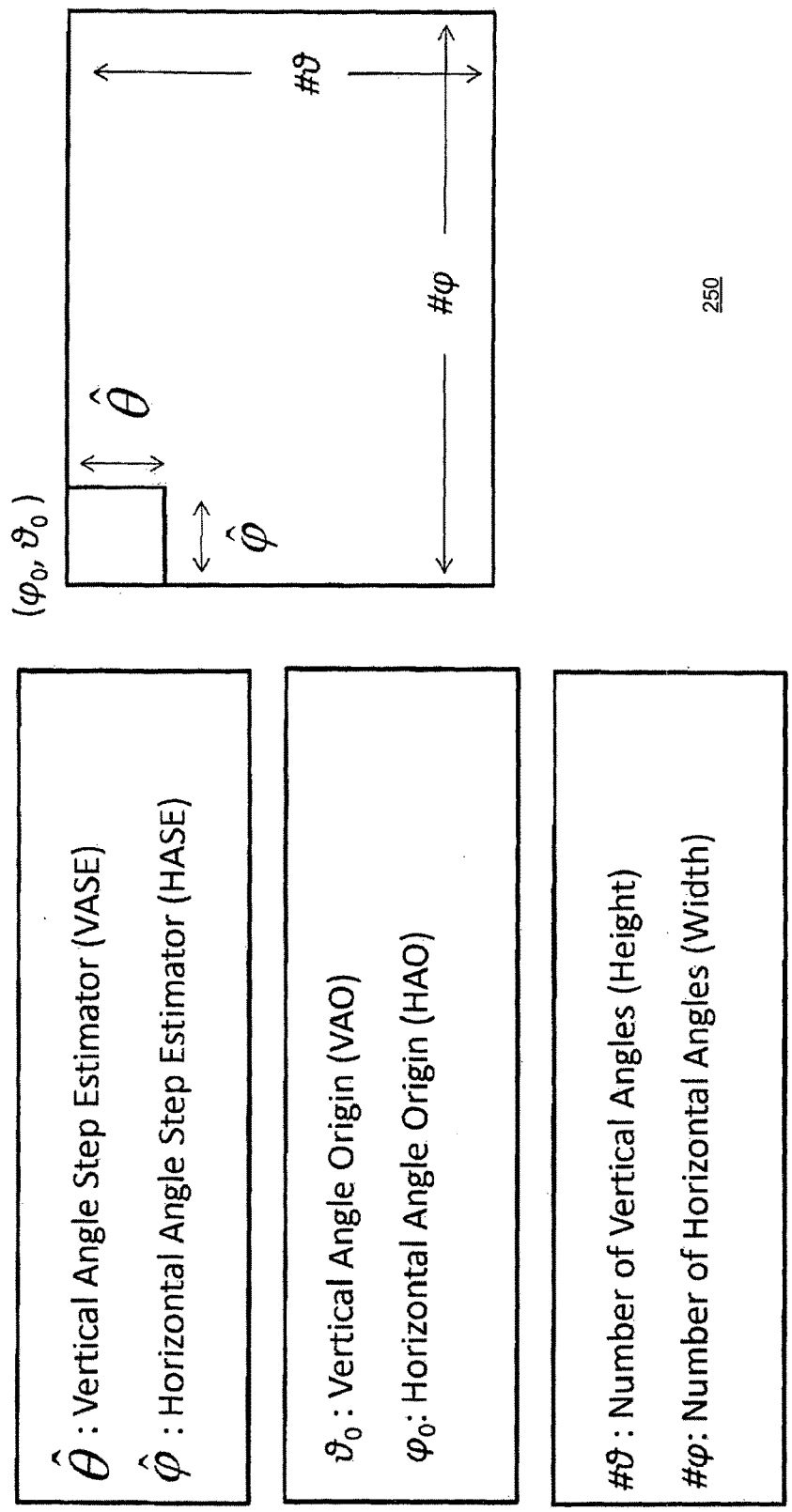
FIG. 2B illustrates the organization of a two-dimensional grid structure.

FIG. 2B illustrates at 250 the organization of a 2D grid structure. In this example, the grid structure is defined by a set of grid parameters suited for a scanner:

$\hat{\theta}$ Vertical Angle Step Estimator (VASE)

$\hat{\varphi}$ Horizontal Angle Step Estimator (HASE)

$\theta_0$ Vertical Angle Origin (VAO)

$\varphi_0$ Horizontal Angle Origin (HAO)

$\theta$ Number of Vertical Angles (Height)

$\varphi$ Number of Horizontal Angles (Width)

Figure 3:
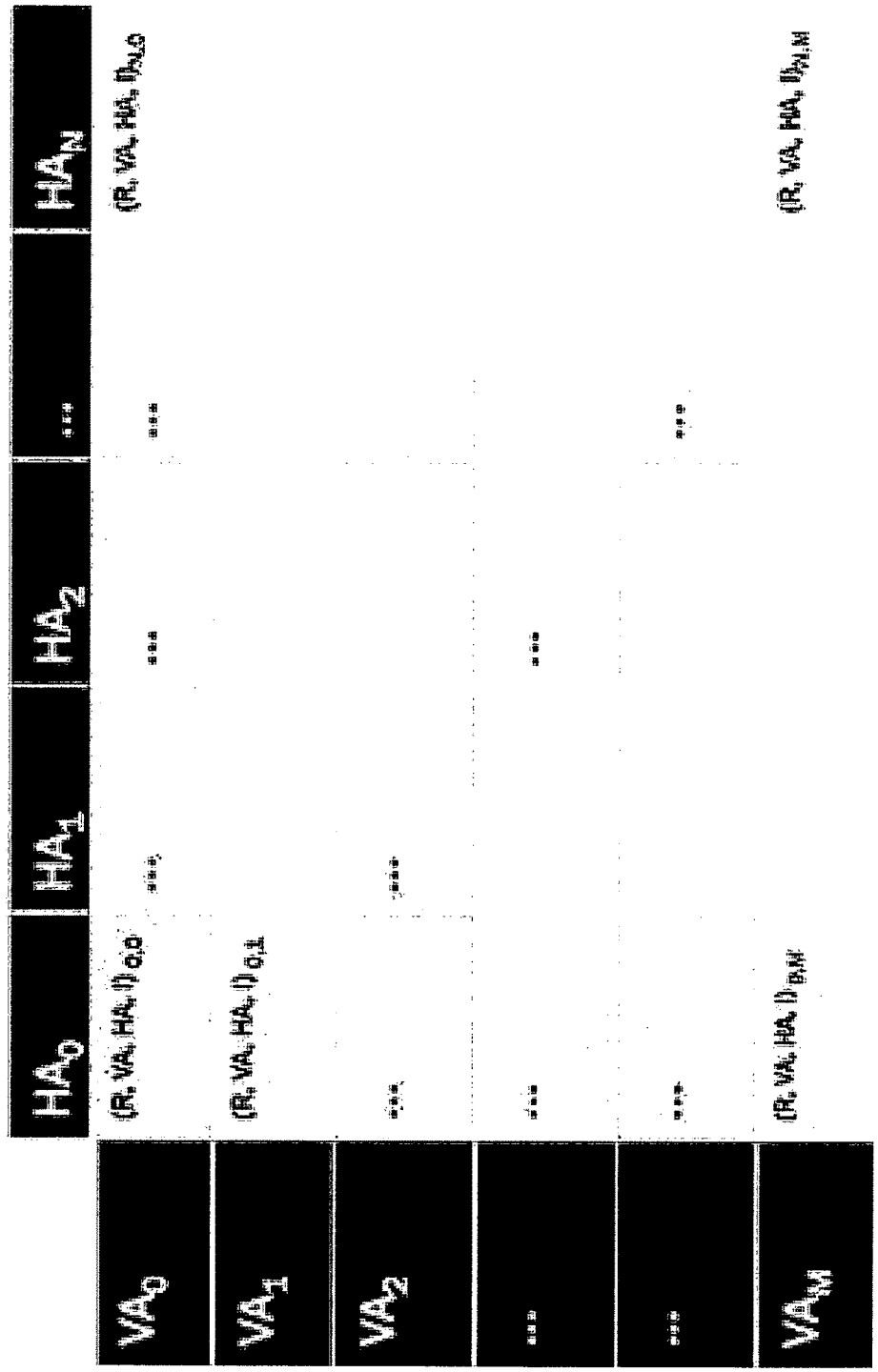
FIG. 3 illustrates a manner of populating the grid structure of FIG. 2B.

FIG. 3 illustrates at 300 a manner of populating the grid structure of FIG. 2B. Cells are arranged in rows ($VA_0$, $VA_1$, $VA_2$, ... $VA_M$) and columns ($HA_0$, $HA_1$, $HA_2$, ... $HA_N$). Each cell contains a set of point data, e.g., cell $HA_0$, $VA_0$ contains point data (R, VA, HA, I)$_{0,0}$ and cell $HA_M$, $VA_N$ contains point data (R, VA, HA, I)$_{M,N}$.

Populating the grid structure as shown in FIG. 3 has several drawbacks. First, the entire data set of a scan is embodied in a single data structure which can be cumbersome to compress, store, decompress and process. Second, it can be difficult and time-consuming to identify or select aspects of interest in the data set, since it is structured as a single entity. Third, if the data set is not segmented it will not fit in the RAM available in current scanners. Fourth, the compression rate is not good because the data is heterogeneous. Fifth, data access is inefficient because the whole scan data set must be manipulated to access even one byte of data.

Figure 4:
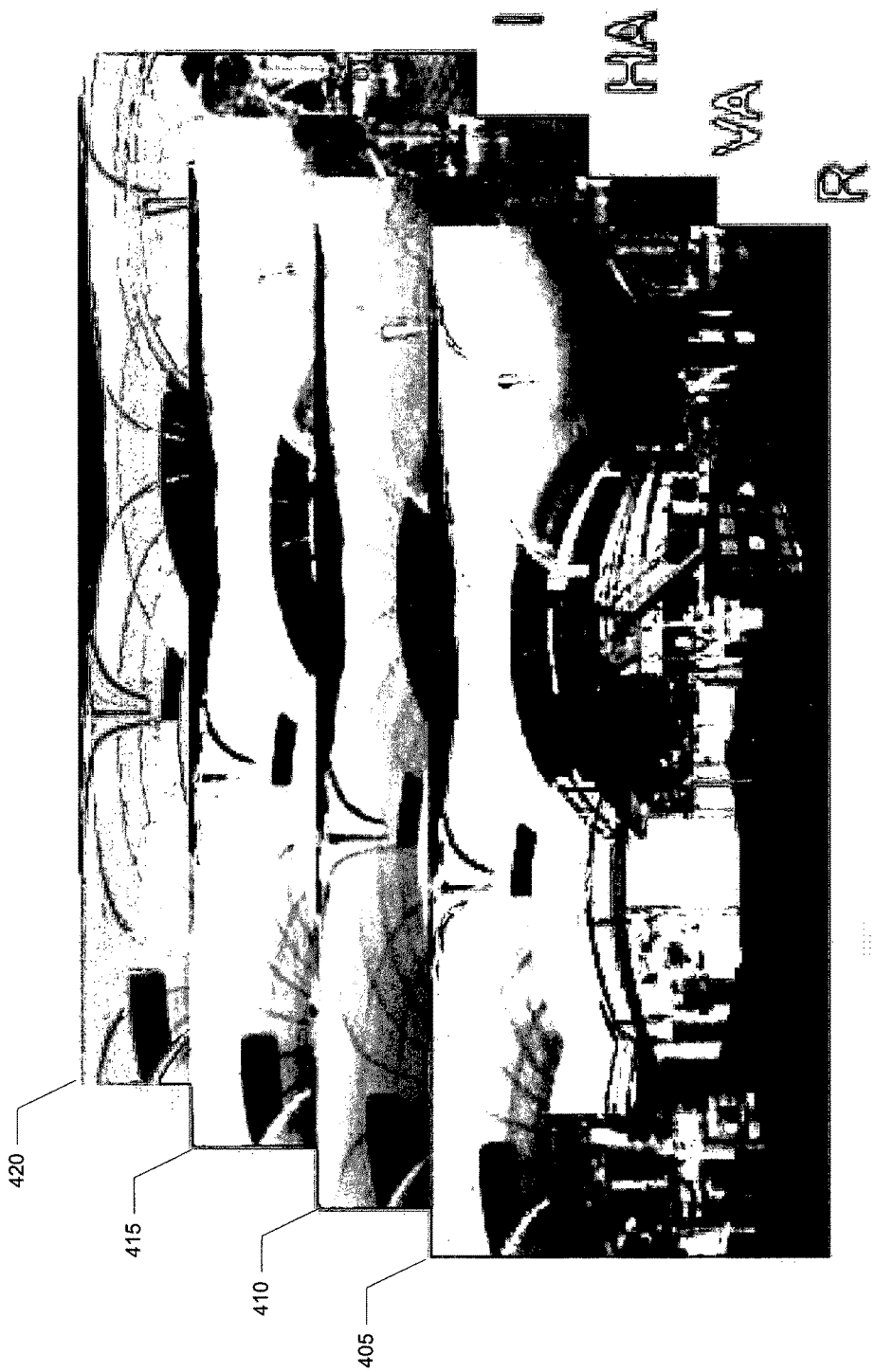
FIG. 4 illustrates a layer organization in accordance with some embodiments of the invention.

FIG. 4 illustrates at 400 a layer organization in accordance with some embodiments of the invention. In this organization the data set uses a 2D grid as in FIG. 3 with cells arranged in rows and columns, but the data is separated into layers by component. For example, a layer 405 contains the range data R, a layer 410 contains the vertical angle data VA, a layer 415 contains the horizontal angle data HA, and a layer 420 contains the intensity data I.

Thus, data representing 3D points can be readily stored using a 2.5D structure (2D grid with a data element per cell) in multiple layers.

For example, distance and intensity data are stored in separate layers, and the vertical angle and horizontal angle data are assumed to be the center of the cell (an approximation).

Figure 5:
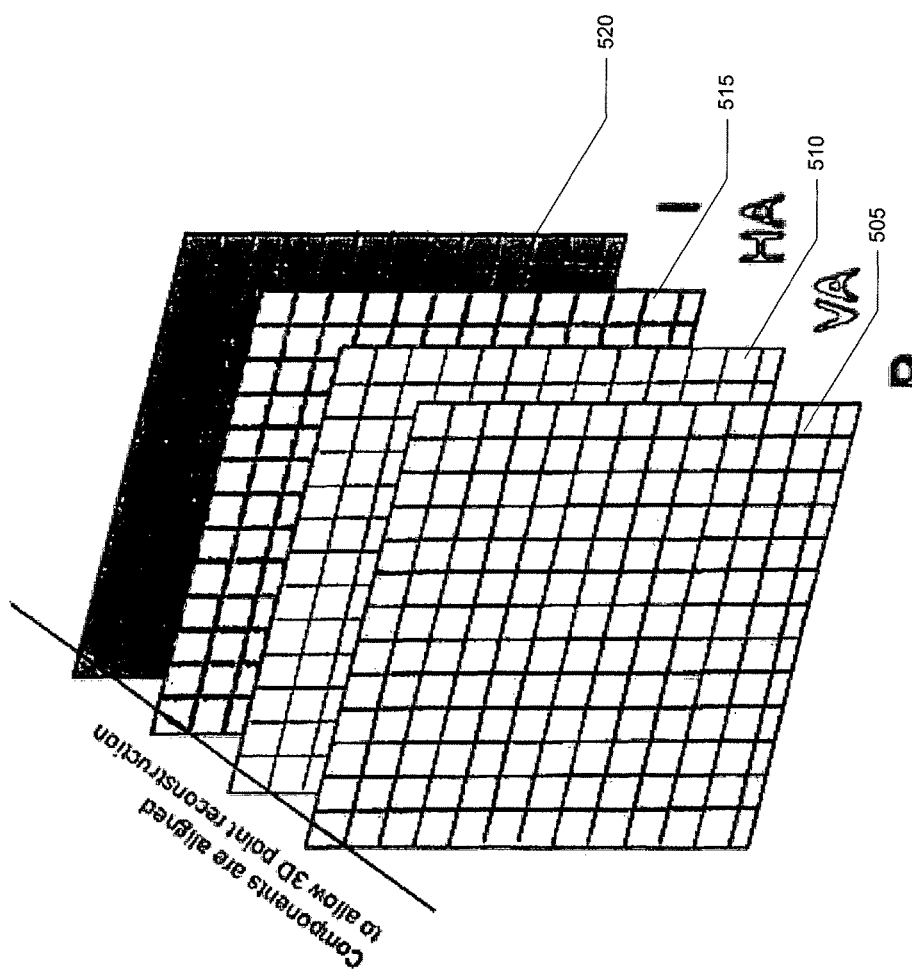
FIG. 5 shows another view of the layer organization of FIG. 4.

FIG. 5 shows at 500 another view of the layer organization of FIG. 4, in which the cells of each layer are aligned with cells of the other layers corresponding to a given point. That is, a cell of grid 505 contains the ranging data R for a given point, and the corresponding cell of grids 510, 515, 520 contain respectively the vertical angle data VA, horizontal angle data HA, and intensity data I for the given point. Though the layers are separated by component, the data for a given point is readily retrieved from the corresponding cells in the component layers. Each layer can have, for example four bytes per cell for range, four bytes for VA, four bytes for HA, one or two bytes for intensity, and typically three bytes for color information, but using multiple layers allows any number of bytes per point.

Figure 6:
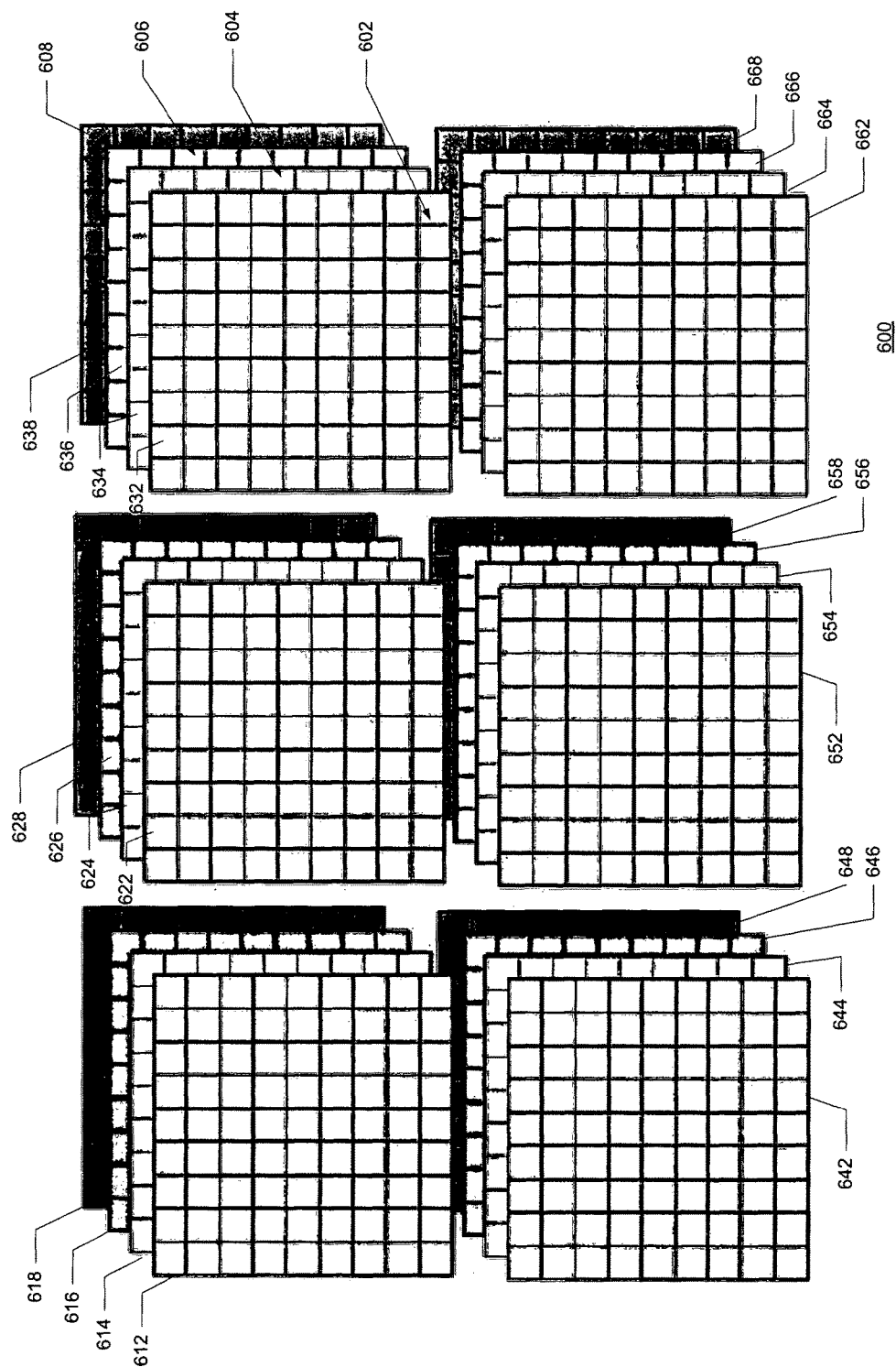
FIG. 6 illustrates a segmentation of a layered grid into patches of cells in accordance with some embodiments of the invention.

FIG. 6 illustrates at 600 a segmentation of the layered grid into patches of cells in accordance with some embodiments of the invention. In this example, the point data is separated into four layers: 602, 604, 606 and 608. For convenience of illustration, each layer is segmented into six patches, though the segmentation is preferably divided to achieve a patch size selected for ease of processing and transmission and manipulation, such as 512×512 cells or any other selected size. In this example, layer 602 is segmented into patches 612, 622, 632, 642, 652 and 662; layer 604 is segmented into patches 614, 624, 634, 644, 654 and 664; layer 606 is segmented into patches 616, 626, 636, 646, 656 and 666; and layer 608 is segmented into patches 618, 628, 638, 648, 658 and 668.

Segmenting the layered grid into patches has a number of advantages. The patches are small relative to the size of the overall data set, and thus facilitate efficiency of, storage and retrieval, and transmission over a communication channel. Patch size is a tradeoff between higher compression ratio for larger patches and more efficient data handling and transfer and decompression of patches containing the points of interest. If a particular patch or group of patches is of interest, it is possible to retrieve and decompress only those patches, rather than the entire data set. Patches are suited to parallel processing, allowing more flexible and efficient use of processing resources.

The patches can be of a selected resolution, such as 512×512 cells per patch. In accordance with some embodiments, these are converted to a lower resolution for streaming over a communication channel, such as by sampling of a patch of 512×512 cells to 256×256 or 128×128 or 64×64 cells. In accordance with some embodiments, a lower resolution patch such as 64×64 cells is initially displayed and the remaining cells are filled in over time to achieve a higher resolution display such as 128×128 or 256×256 or 512×512 cells. With this approach a user viewing the display can have a fast, low-resolution 3D display of a patch or patches of points, useful when looking for areas of interest, followed by a higher-resolution display useful for detailed examination of a patch or patches.

In some embodiments, a patch is split into multiple layers of sparse patches having the same grid coordinates and with the sparse patches containing complementary data, such as sampled data at less than full resolution (for example, 3 mm spacing between points) in each patch. The sparse patches are transmitted in streamed fashion. An advantage is that a sparse overview of the data is available quickly, such as for display, and this is then filled in with a higher density of point data as additional patches are received.

The layered grid structure is extensible as desired by adding more layers. A layer can be added for each desired additional parameter. Additional parameters can include, for example, a time stamp, a quality indicator, color data such as RGB information, a second distance measurement and/or other parameters. Derived patches can be, for example, user selected points, normals (a computed value representing a normal to the tangent of a surface at each point), discontinuities, or defined by any other desired parameter. Some embodiments of the invention provide one or more layers containing raw data (such as data from a scanner) and one or more layers containing data processed and/or filtered from other layers, such as a segmentation of points by object in different layers.

The grid structure lends itself to being populated in real time as data are acquired during a scan. The 2.5D grid structure (each layer being a 2D grid of cells with each layer storing one parameter) is adapted to projecting data into the grid structure quickly so as to minimize data loss when acquiring point data at high speed.

The grid structure also lends itself to conversion of existing scanner databases. In some embodiments, the points of an existing database are projected into the grid structure line by line (i.e., scan line by scan line), rather than point by point. In some embodiments, not every point is projected into a cell, but rather a "central value" of the points of a scan line (which may be oblique to the grid) is projected into a column of cells in the grid. The "central value" determined, for example, as a barycenter of the points of a scan line, is projected into the cells of a grid column. This approach is useful for existing scan data sets in which the point spacing is not well enough distributed to project each point into its own cell, so that multiple points would correspond to one cell, leaving empty cells with no data. This means information is being discarded and lost, and does not provide a good display for the user due to holes in the grid.

Similarly, a very high speed scanner which acquires points faster than they can be processed can use a "central" value for a scan line to populate a column. In one such high-speed scanner, there are measured angles for all points even if there is no distance measurement and, in this case, the "central" value is taken as the value at the center of the oblique scan line for its horizontal angle (HA).

In contrast, when converting an existing scan data set, there are no point measurements when scanning in the sky and there are thus no distance values and no angle value, just no information. In this case there is no point to be used as a "central" value. For conversion of existing files some embodiments use quartiles—take all HA values for the line, take the central value which represents, e.g., 50% of the values which are central and discard outliers. Since scanners obtain unreliable values at the zenith, the average of the "central" values can be used. This approach has proven to be robust when tested against sample data. It does not have to be 50% of the values which are central, but can instead be 10% or just one value such as the median value. Taking just one value can be a problem when there are several modes, so an average of "central" values can be used, e.g., an average of central values (baricenter) after discarding outliers.

FIG. 7A shows at 700 an example of a portion of a regular grid 705 of cells to be populated, including a first column 710 of cells and a second column 715 of cells.

FIG. 7B shows at 730 an example of a first oblique scan line 735 and a second oblique scan line 740 overlaid on a portion of a grid 745, each line having a series of point-scan values which are mostly not aligned with cells of the grid.

FIG. 7C shows a process 750 for populating a grid such as grid 705 using point-scan values of a scan having oblique scan lines such as scan lines 735, 740. The process begins at 755. At 760 a "central" value (such as a barycenter "V" shown on line 735 in FIG. 7B) is determined from the scan values of scan line 705. At 765 the "central" value is used to populate the cells of line 715 (e.g., the cells of column 710 in FIG. 7A are populated with the barycenter value "V" of line 735). At 770 a check is made whether additional oblique scan lines are to be processed and, if yes, the process of steps 760, 765 is repeated to populate a further grid column of cells using data from a further oblique scan line such as line 740. If no, the process optionally ends at 775.

In this manner a two-dimensional problem is projected into a one-dimensional problem. In an ideal case the scan values of each scan line would match with the cells of a grid column. In the real world the alignment is imperfect: sometimes more than one scan line matches a single column and sometimes no scan line matches a given column. Two projections results in one column of scan line data and one column with no scan line data. In an optional step 780 a check is made to determine if there are empty grid cells ("holes"). If yes, then in an optional step 785 an algorithm is used to populate the empty grid cells (fill the "holes") with suitable values.

The suitable values are in some embodiments derived from adjacent cells which are populated.

Often a scanner will provide more than 360 degrees of scan lines. In this case there is a surplus of scan lines of data; in some embodiments these data are taken as suitable values and projected into the empty grid cells.

Data are thus projected into a grid structure in accordance with some embodiments. Line-based correction can have error at a given grid cell, but scan line drift in the grid columns is avoided.

Scanners can also have vertical angle drift. Vertical angle drift is corrected in accordance with some embodiments by projecting the "central" value of a scan line into the correct row of the grid even if other scan lines are misplaced relative to the grid. Scan lines are thus registered across one row of the grid to avoid vertical line shift (drift).

Various types of scanning can be accommodated with embodiments of the invention by using grid axes adapted to the nature of the scan data. Static terrestrial scanning typically uses a spherical grid, with grid axes being vertical angle and horizontal angle as in the examples described above. In contrast, mobile scanning can be considered as having a linear component, e.g., vehicle path vs scan angle. For example, a vehicle-mounted non-static scan can use a longitudinal (tubular or partial-tubular grid) having vehicle path (longitudinal displacement of the vehicle) as one axis and angle of scan about the vehicle path as the other axis. For example, a grid defining a planar region can be populated with aerial scanning data. For example, unstructured point-measurement data (such as from a total station, e.g., a Trimble Vx Spatial Station available from Trimble Navigation Limited of Sunnyvale, Calif., USA, which combines scanning, surveying and imaging deliverables) can be projected into a high resolution grid (such as a camera image pixel grid which has color and intensity information) and the three-dimensional point-measurement data are projected into the grid to obtain sparse layers of three-dimensional information. The grid structure can thus be adapted to any metrics needed to describe the available measurements.

The grid structure and segmentation into patches also facilitates field processing of the data such as in a scanner processor or a separate processor in the field, without requiring a change of file format of the scan data. This is in contrast to prior art techniques in which the file format is determined by the scanner hardware, with the data initially recorded as a sequential data file in the sequence acquired during the scan, and only later transformed in post-processing of the entire set of scan data in office software.

Figure 8A:
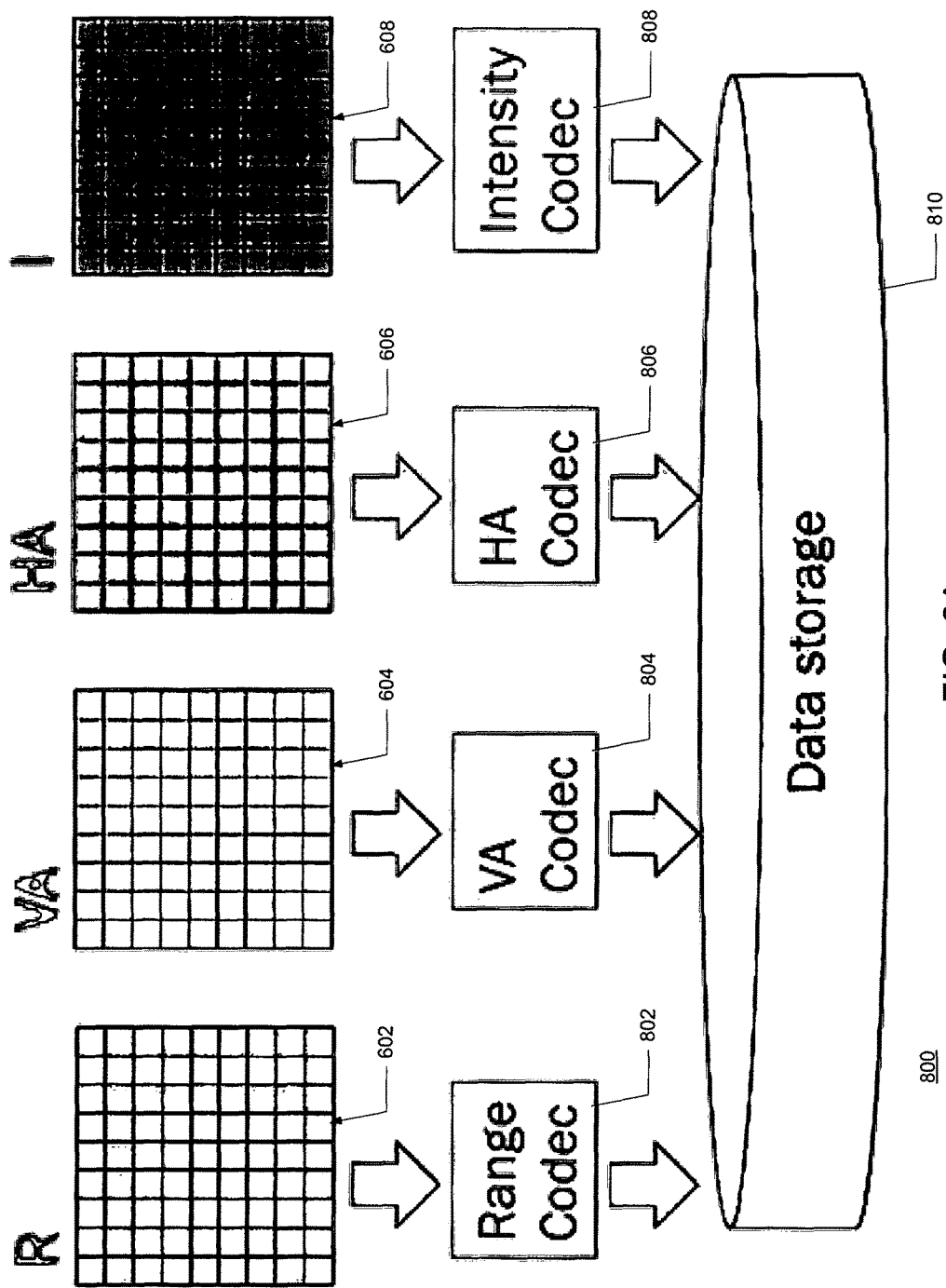
FIG. 8A shows patch compression using for each layer a codec suited to the component data of the layer.

FIG. 8A shows at 800 an example of patch compression using for each layer 602, 604, 606, 608 a coding/decoding algorithm (codec) suited to the component data of the layer. For example, a codec 802 suited to range data is used to compress the range data patches of layer 602, a codec 804 suited to angle data is used to compress the angle data patches of layer 604, a codec 806 suited to angle data is used to compress the angle data patches of layer 606, and a codec 808 suited to intensity data is used to compress the intensity data patches of layer 608. Compressed patches are stored in a data store 810. Transformations include quantifications determined by measurement accuracy and/or precision of the information. The sequence includes transformation, quantification, encoding.

FIG. 8B shows at 820 an example of a codec 825. Codec 825 comprises a predictor 830, a summer 835 and an encoder 840.

FIG. 8C shows at 850 an example of the coder side of a codec having (optionally) a point reordering element 852, a quantifier element 854, a predictor element 856, a summing element 858 and a compression element 860.

Figure 8D:
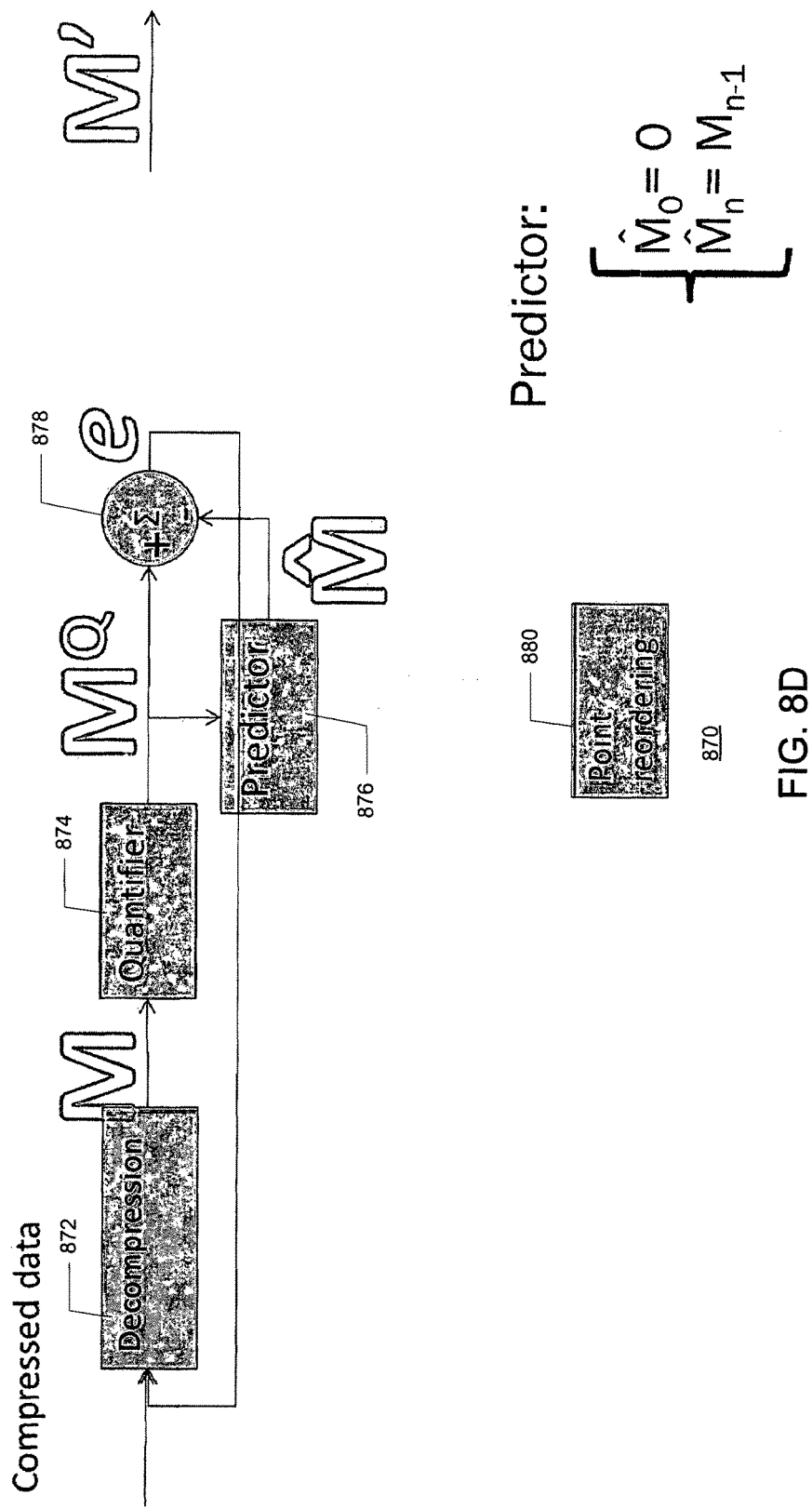
FIG. 8D shows an example of the decoder side of a codec.

FIG. 8D shows at 870 an example of the decoder side of a codec having a decompression element 872, a quantifier element 874, a predictor element 876, a summing element 878 and (optionally) a point reordering element 880.

If desired, the angle-data codecs 804 and 806 can use the same algorithm since they are both used to compress angle data. However, scan angle data are not always symmetrical. For scanners of the type shown in FIG. 1 a vertical scan line of point measurement data (e.g., VA incrementing from zero degrees to 360 degrees) is acquired for each horizontal angle (HA) increment. That is, vertical angles change from cell to cell in a scan line, but the horizontal angle is constant or near-constant for a scan line. In some embodiments, the vertical angles are transposed from columns to rows, then the derivative of each row is taken. If, for example, the horizontal angle differs by nearly zero (e.g., 0.1 degree) from sample to sample, taking the derivative will give a constant. Zip compression works better with constant values than with varying values and is well-suited for compression of data as acquired in a scanner with this transposition. Thus for zip compression the values are rearranged so the coding algorithm will find constant values. Vertical angle varies along one scan line. HA does not vary along scan line so we don't take the derivative. The compressed patches are passed to suitable data storage 810. An LZMA encoder is suitable for office software, which does the same job—LZMA is very good at finding irregularities that a value is changing at a constant rate.

Figure 8E:
FIG. 8E shows an example of patch transposition.

FIG. 8E shows at 882 an example of such a patch transposition. A patch 884 has data sequentially arranged by column and row. The transposed patch 886 has the same data sequentially arranged by row and column.

Encoding the derivative of each transposed row rather improves the compression ratio of angles when encoded with a ZIP or ZIP-like technique. Other transformations are possible and are specific to each component and each codec: a codec suited to real-time processing of data in a scanner might use a different approach than a codec suited to post-processing of data files.

Figure 9:
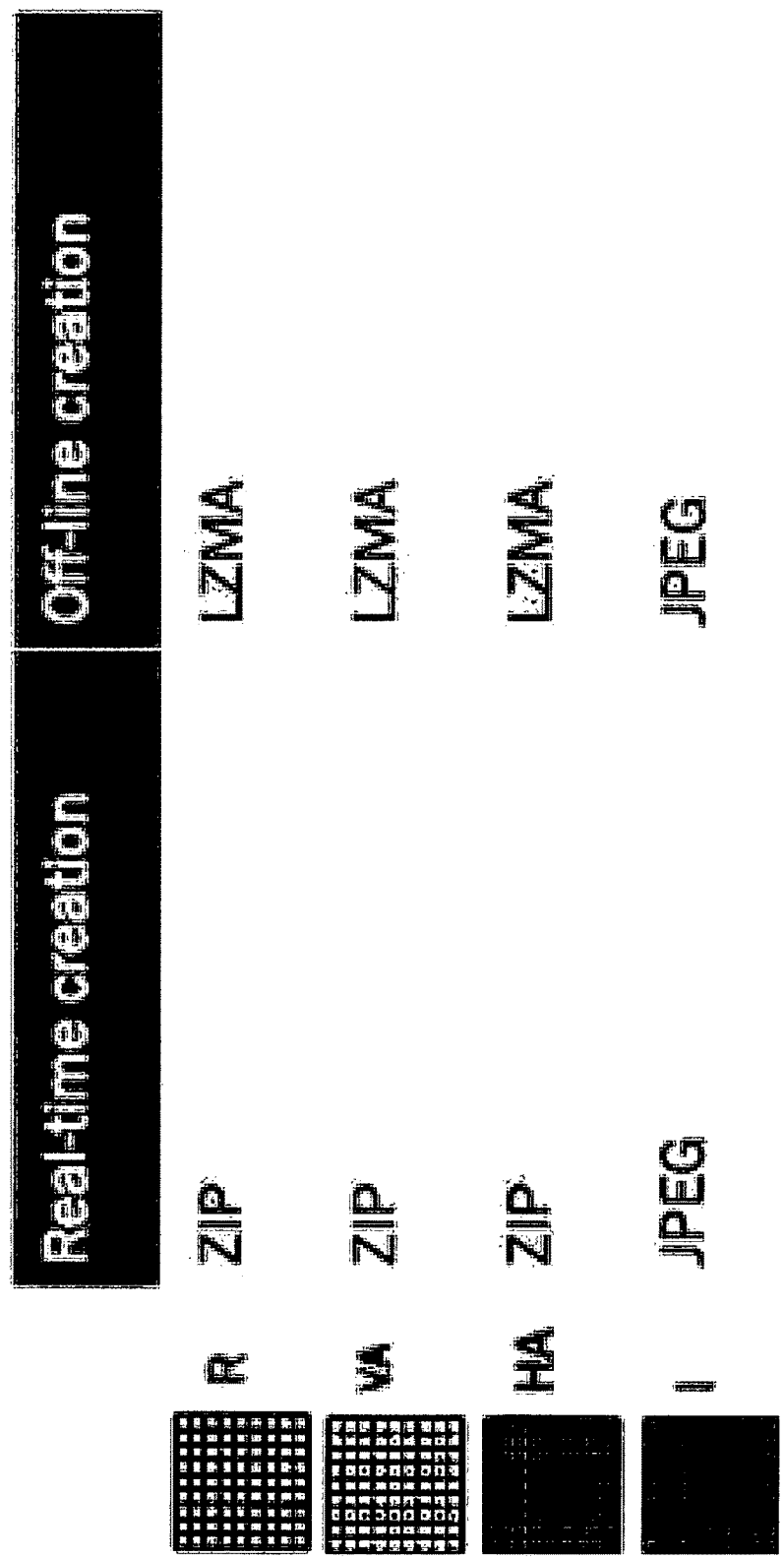
FIG. 9 shows a table of encoders suited to the component layers of a scanner for real-time and off-line file creation.

FIG. 9 shows at 900 a table of encoders suited to the component layers R, VA, HA and I of a scanner for real-time file creation and for off-line file creation respectively. There is a trade-off between the time spent to encode data and the compression ratio one can expect to achieve. Thus, files created in real-time (as the measurement data are streamed from the scanner) can be bigger because they are encoded with a less time-consuming algorithm. In the example of FIG. 9, the range data R, the vertical angle data VA and the horizontal angle data HA are compressed with a ZIP encoder for real-time creation and with an LZMA encoder for off-line creation, while the intensity data I are encoded with a JPEG encoder for real-time and for off-line creation.

For compression purposes, a cell can be considered like a pixel of a camera image, except that it may contain any type of parameter, such as angle, distance, intensity, timestamp (or even a camera image parameter such as color). Because the cells of a layer are homogeneous, a codec suited to the data of the layer can be used for better result than with non-homogeneous data.

To summarize, embodiments in accordance with the invention can employ one or more of the following key concepts:
 Patch-based segmentation: Atomic chunks of data organized as two-dimensional (2D) patches
 Decorrelated components: Distance, angles and intensity are encoded separately
 Quantified data: Each component has fixed precision determined by scanner precision
 Compressed data: Each component is compressed separately patch by patch
 Some components can use lossy compression, such as jpeg compression for intensity data
 Codec-based: Each scanner instrument can use its own data transformation and its own compression algorithm, which can be different for each component In accordance with some embodiments of the invention, each codec is in charge of only one type of component such as distance or angle or point intensity. Isolating components by layer means that the data within a layer is homogeneous, allowing better compression rates than with non-homogeneous data. The choice of a codec for a particular layer is a compromise between compactness and speed. Often a compact result requires more processing time but it also need smaller write access to file.

Embedding the compression processing in a portable instrument (e.g., a scanner) which has relatively low processing power (e.g., compared to an office computer) constrains the choice of codec. The need to save the data file as the data is being acquired in the instrument further constrains the choice of codec, as the processor is typically busy with other tasks during data acquisition. Storing the data set after the acquisition is complete would require temporarily holding a very large amount of data in memory until the full data set could be stored.

In general, it is preferable in an instrument to use a simple and light compression algorithm with good compression rate to avoid overloading the processor during data acquisition. It is also advantageous to prepare the data for easy processing by the compression algorithm.

Instruments in accordance with some embodiments of the invention use:
 Any light compression without precision loss for angles and distance (such as zip)
 Any light compression with precision loss for point intensity (such as jpeg)

For example, to process 3D polar points with an intensity value per point, three zip compression processes (VA, HA, distance) and one jpeg compression process (intensity) is running for each patch. These separate processes can be run in parallel to the extent that processing resources are available. Additional components can also be treated in parallel, such as the RGB color of the point.

The zip compression algorithm is robust and quick, with correct compression ratio and without data loss. The jpeg algorithm is robust and quick, with good compression ratio.

There are other and better compression algorithms but they often are heavier in terms of processor load. As the compressions of the different components are launched in parallel, choosing a heavy algorithm may not be appropriate if the data acquisition rate is faster than the compression algorithm can handle, possibly causing memory overflows and loss of data.

Some data preparation considerations include:
 Zip behaves better if the input data is with big chunks of constants. Knowledge of the instrument systems can be used to encourage this.
 Grid organization of cells in rows and columns is similar to pixel-based camera images. This enables efficient post treatments that can make use of existing image-processing functions.
 Many scanner designs acquire data in columns of rows, rather than rows of columns. This is linked to the scanning operation, for example where the vertical deflection is at high speed (describing a circle) and the horizontal deflection is at low speed (describing a half circle). Populating a 2D grid structure inherently converts from column/line to line/column as the data is read, rather than making this conversion when the data is written. With the data organized in column/line, knowledge of the acquisition can be used to simplify the data before applying the zip algorithm. Benefits include the advantage of compression for storage and image organization for later post-processing.

Compression in accordance with some embodiments of the invention can benefit from knowledge of the instrument systems. For example, if vertical angle deflection at a substantially constant speed, computing the derivative of each column of data produces a constant value. In contrast, if the progression of the horizontal angle is slow (e.g., stepwise), it is already organized as chunks of constants.

Compression of distance measurements in accordance with some embodiments of the invention can benefit from prior knowledge of the scene or object being scanned. Doing something may be useful or not but with a cost in processing. For example one can take the derivative of each column of data, though the gain must be balanced against the cost.

Compression of intensity measurements in accordance with some embodiments of the invention use the jpeg algorithm, which has been found optimal for this kind of data. Other algorithms can be substituted as desired.

Figure 10:
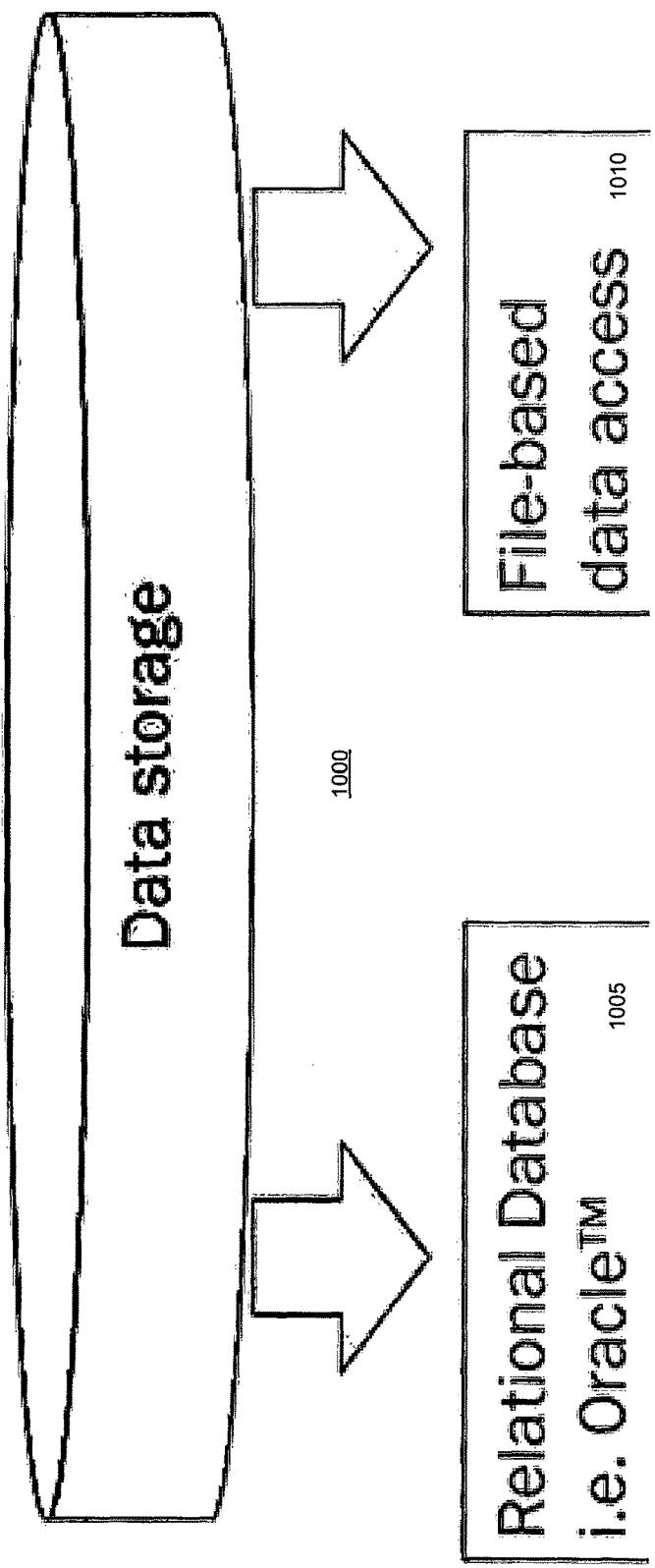
FIG. 10 shows data storage alternatives.

FIG. 10 shows at 1000 two implementation alternatives for data storage 710. The data can be stored in a relational database 1005 such as an Oracle database, or can be stored in a file-based data access format 1010. The latter is suitable for scanner-generated data and for currently available office software.

Figure 11:
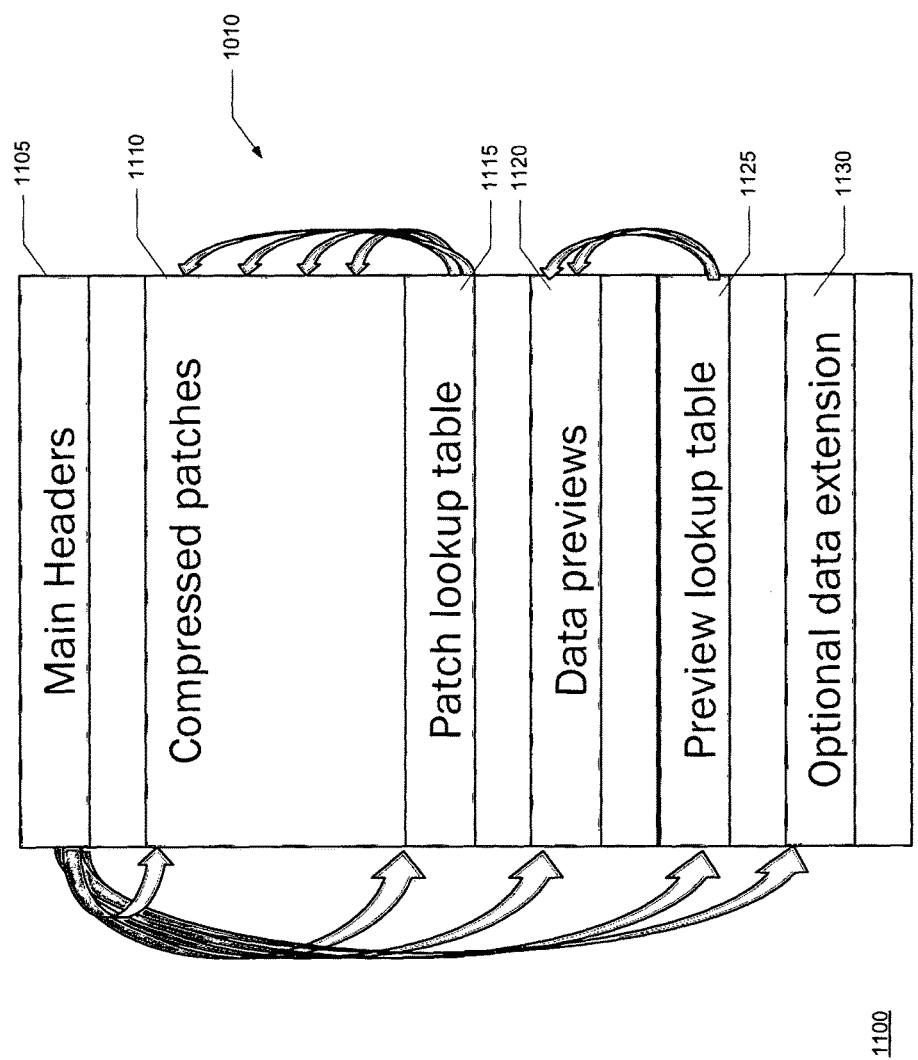
FIG. 11 shows a file-based data access format in accordance with some embodiments of the invention.

FIG. 11 shows at 1100 an overall file structure of a file-based data access format 1010 in accordance with some embodiments of the invention. Main headers 1105 contain pointers to compressed patches 1110, patch lookup tables 1115, data previews 1120, a preview lookup table 1125, and optionally one or more data extensions 1130. Patch lookup table 1115 contains pointers to respective patches within compressed patches 1110. Preview lookup table 1125 contains pointers to respective data previews within data previews 1120.

Figure 12A:
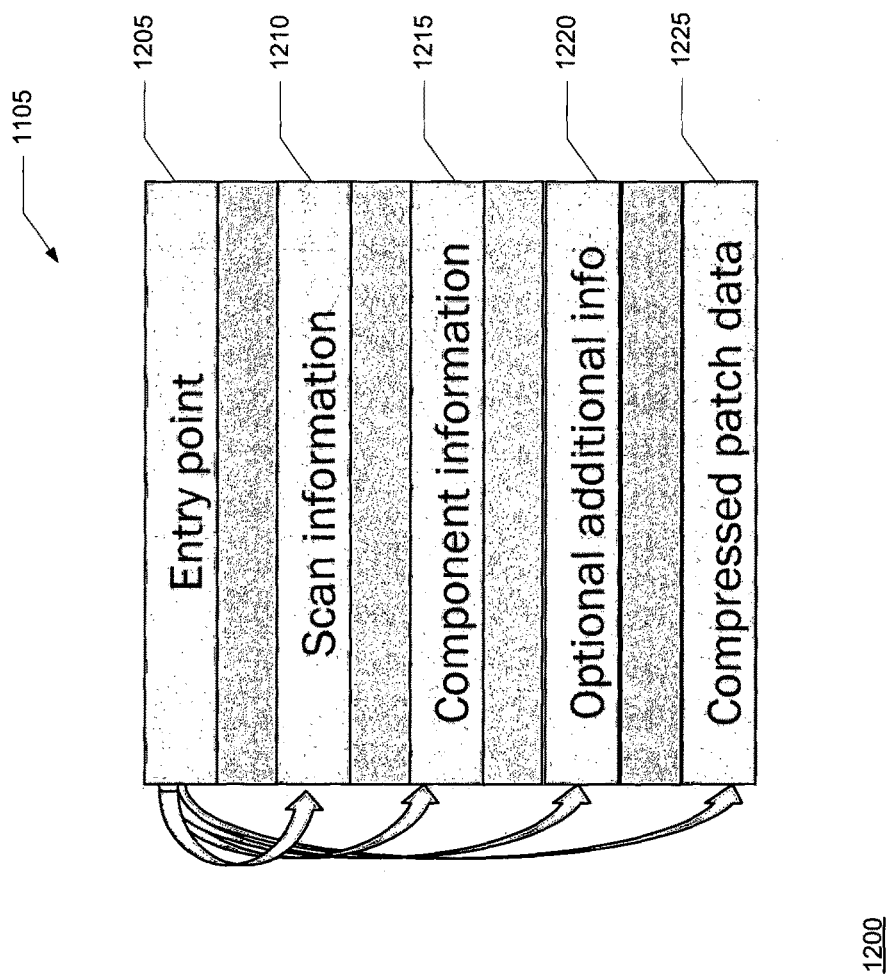
FIG. 12A shows an example of main headers in accordance with some embodiments of the invention.

FIG. 12A shows at 1200 the structure of main headers 1105 in accordance with some embodiments. An entry point structure 1205 contains pointers to access scan information 1210, component information 1215, optional additional information 1220, and compressed patch data 1225.

Figure 12B:
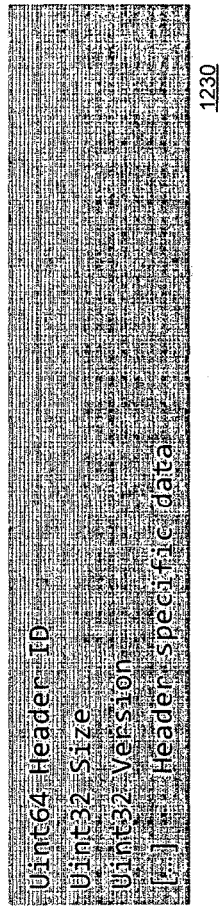
FIG. 12B shows an example of a header structure common to all headers in accordance with some embodiments of the invention.

FIG. 12B shows at 1230 an example of a header structure common to all headers in accordance with some embodiments.

Figure 12C:
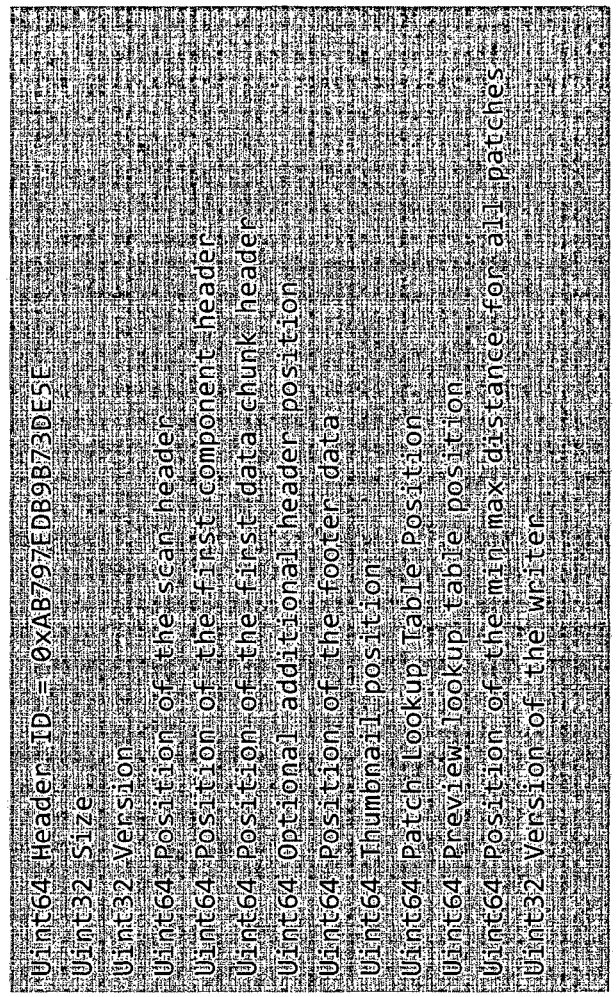
FIG. 12C shows an example of a main header entry point structure in accordance with some embodiments of the invention.

FIG. 12C shows at 1235 an example of a main header (entry point) structure in accordance with some embodiments.

FIG. 12D shows at 1240 an example of a scan information structure in accordance with some embodiments. In this example, registration information is represented by 12 doubles: three X, Y, Z direction vectors and a (x,y,z) point for the origin.

Figure 12E:
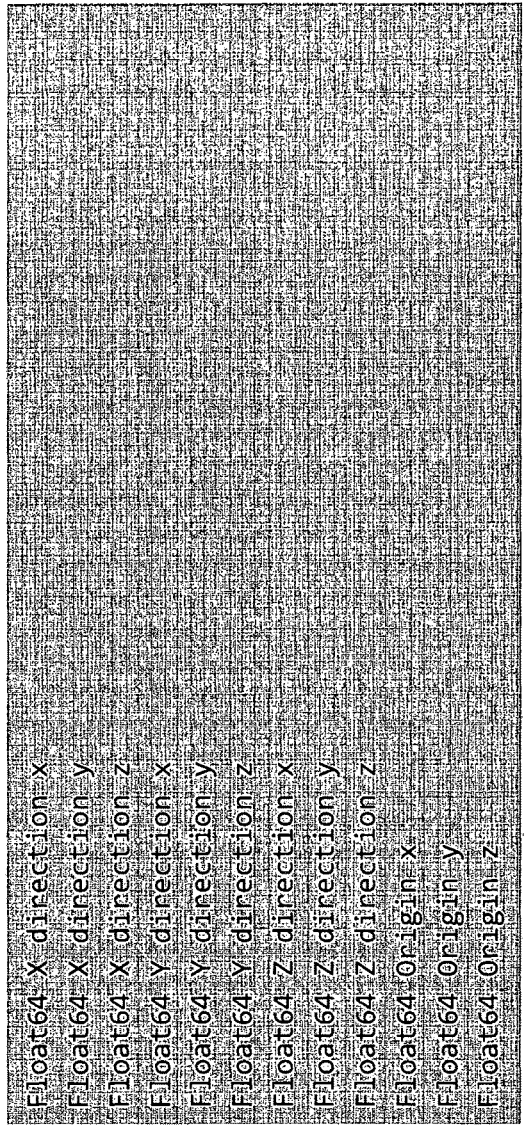
FIG. 12E shows an example of a registration information structure in accordance with some embodiments of the invention.

FIG. 12E shows at 1245 an example of a registration information structure in accordance with some embodiments.

Figure 12F:
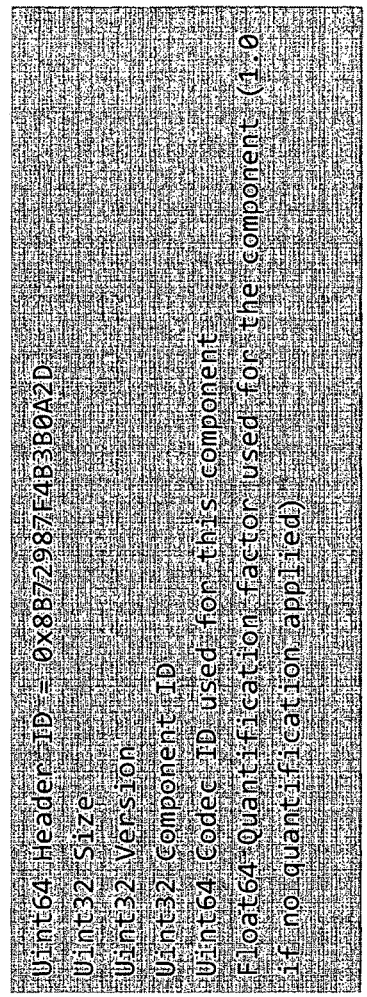
FIG. 12F shows an example of a component structure in accordance with some embodiments of the invention.

FIG. 12F shows at 1250 an example of a component structure in accordance with some embodiments. One such header is provided for each component.

Figure 13:
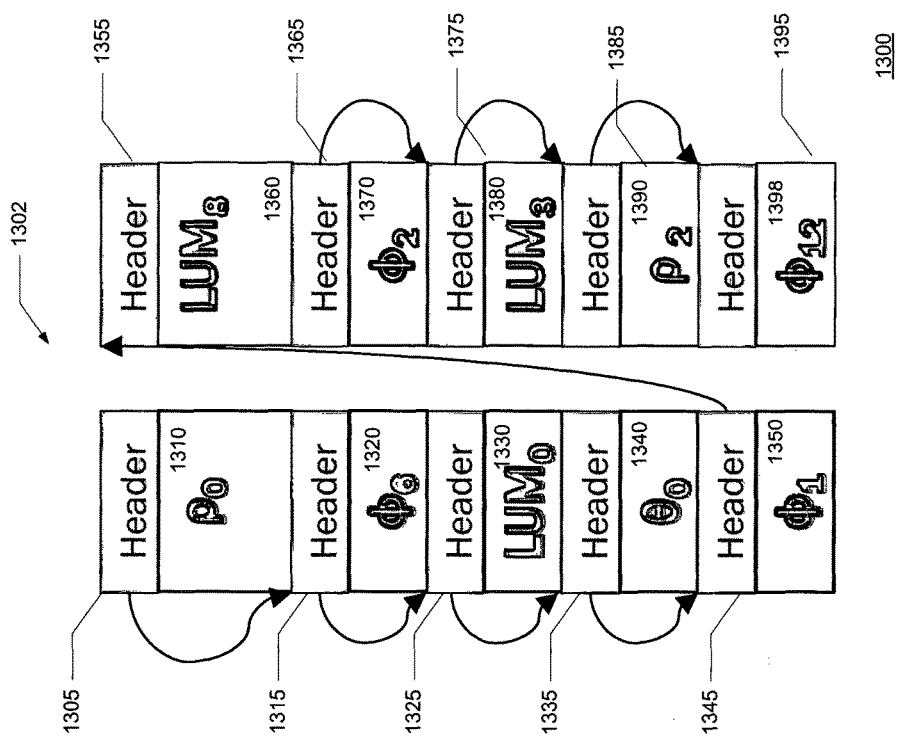
FIG. 13 shows an example of a chained data structure in accordance with some embodiments of the invention.

FIG. 13 shows at 1300 an example of the chained data structure 1302 in accordance with some embodiments. Each data chunk contains a data chunk header defining parameters of the data chunk, such as data size, chunk type, line coordinate, column coordinate, minimum value, maximum value, and bytes of component data. Data chunks can be stored in arbitrary order.

In the example of FIG. 13, a chained data file contains in sequence a header 1305 with data chunk 1310 of range data, a header 1315 with data chunk 1320 of angle data, a header 1325 with a data chunk 1330 of luminance data, a header 1335 with a data chunk of angle data 1340, a header 1345 with a data chunk 1350 of angle data, a header 1355 with a data chunk 1360 of luminance data, a header 1365 with a data chunk 1370 of angle data, a header 1375 with a data chunk 1380 of luminance data, a header 1385 with a data chunk 1390 of range data, and a header 1395 with a data chunk 1398 of angle data. The data chunks are stored in arbitrary order.

Figure 14A:
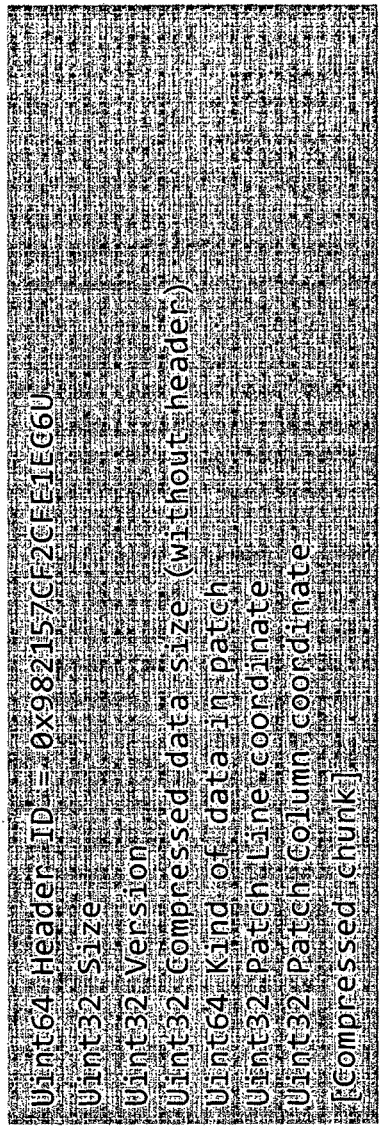
FIG. 14A shows an example of a data chunk header structure in accordance with some embodiments of the invention.

FIG. 14A shows at 1400 an example of a data chunk header structure in accordance with some embodiments of the invention.

Figure 14B:
FIG. 14B shows an example of detail of a compressed data chunk in accordance with some embodiments of the invention.

FIG. 14B shows at 1405 an example of detail of a compressed data chunk in accordance with some embodiments.

Figure 15A:
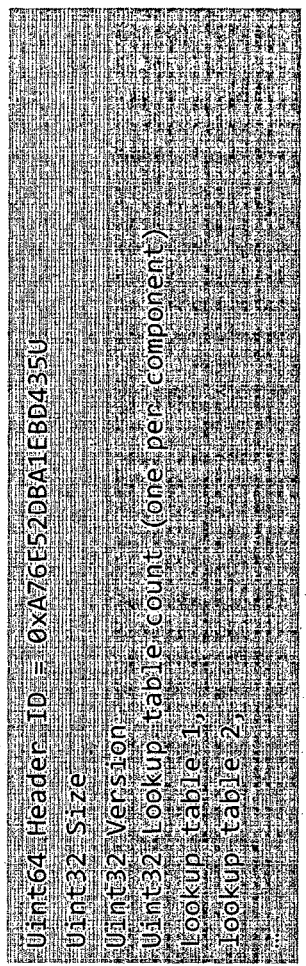
FIG. 15A shows an example of a lookup tables header structure in accordance with some embodiments of the invention.

FIG. 15A shows at 1500 an example of a lookup tables header structure of a lookup tables structure in accordance with some embodiments of the invention.

Figure 15B:
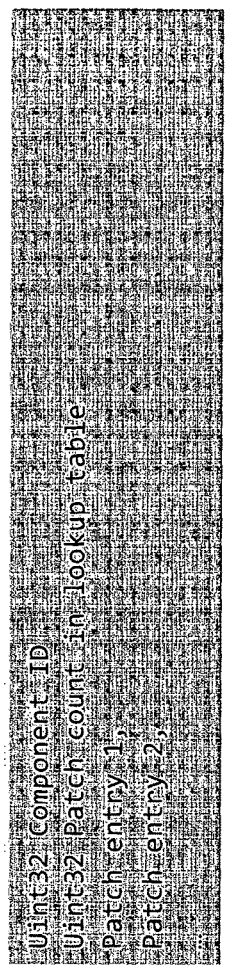
FIG. 15B shows an example of a structure within a lookup table in accordance with some embodiments of the invention.

FIG. 15B shows at 1505 an example of a structure within a lookup table in accordance with some embodiments of the invention.

Figure 15C:
FIG. 15C shows an example of a patch entry within a lookup table structure in accordance with some embodiments of the invention.

FIG. 15C shows at 1510 an example of a patch entry within a lookup table structure in accordance with some embodiments of the invention. In this example, patch entries are stored in order, starting with the top left patch, and moving toward the right until end of a line. Then the second line is stored from left to right and so on.

FIG. 16A shows at 1600 an example of a data previews structure in accordance with some embodiments of the invention. In this example, data previews are stored as a compressed chunk, like a rectangular patch but without a data chunk header.

FIG. 16B shows at 1605 an example of a data previews lookup tables structure in accordance with some embodiments of the invention. In this example, data previews lookup tables are stored as lookup tables with only one data chunk.

FIG. 16C shows at 1610 an example of a data previews structure in accordance with some embodiments of the invention, showing a patch count of 1 in the lookup table.

FIG. 16D shows at 1615 an example of an application programming interface (API) for writing data to a data structure in accordance with some embodiments of the invention.

FIG. 16E shows at 1620 an example of an application programming interface (API) for reading data from a data structure in accordance with some embodiments of the invention.

In some embodiments there is one data preview per component, e.g., of 2 Mpixel. A first use of a data preview is within the scanner itself. For example, a scanner having a display screen can display a data preview as a preview of the scan on the screen. The data preview allows algorithms to be applied for example to adjust the image intensity. Algorithms can also be applied for example to the three-dimensional data (e.g., to the angle and range data defining point positions). A down-sampled set of three-dimensional data can be transmitted for example to a client via a transmission link such as the internet. For these and other uses a data preview is in some embodiments prepared and stored for each stored component layer. In some embodiments a preview is created each time a component layer is added to the data structure. In some embodiments, the same codec is used to compress each data preview layer as is used for the patches of that component layer. Hence the term "data chunk" can refer either to a data preview or to a patch.

A "data chunk" is a grid of data compressed with one of the codecs. In some embodiments a patch is a square data chunk with coordinates, while a data preview is a non-square, rectangular grid representing a sample of the whole scene. In some embodiments the preview is filled with range information (real data) rather than with created "false" points (such as averages).

Figures 17A, 17B:
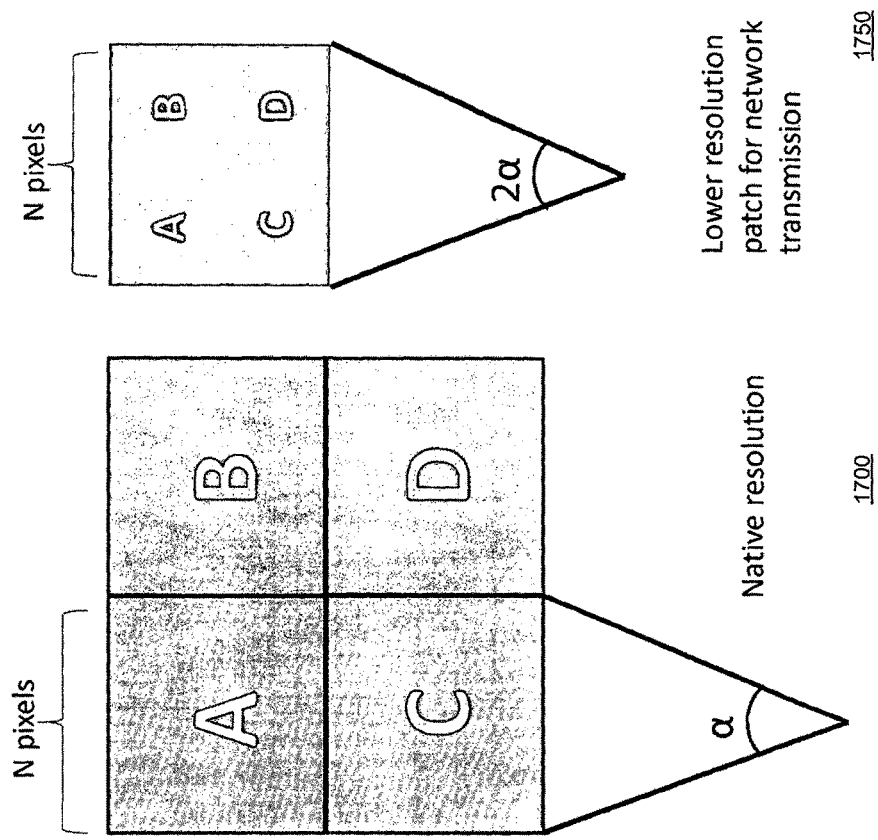
FIG. 17A shows a patch data structure in accordance with some embodiments of the invention.
FIG. 17B shows a down-sampled patch data structure in accordance with some embodiments of the invention.

FIG. 17A and FIG. 17B illustrate a patch down-sampling strategy for data transmission. FIG. 17A shows at 1700 a data structure having patches A, B, C, D each having N×N grid cells ("pixels") with a native angular resolution α. FIG. 17B shows at 1750 a single down-sampled patch covering the region of patches A, B, C, D and having a lower angular resolution 2α suitable for example for transmission over a network.

Figure 18:
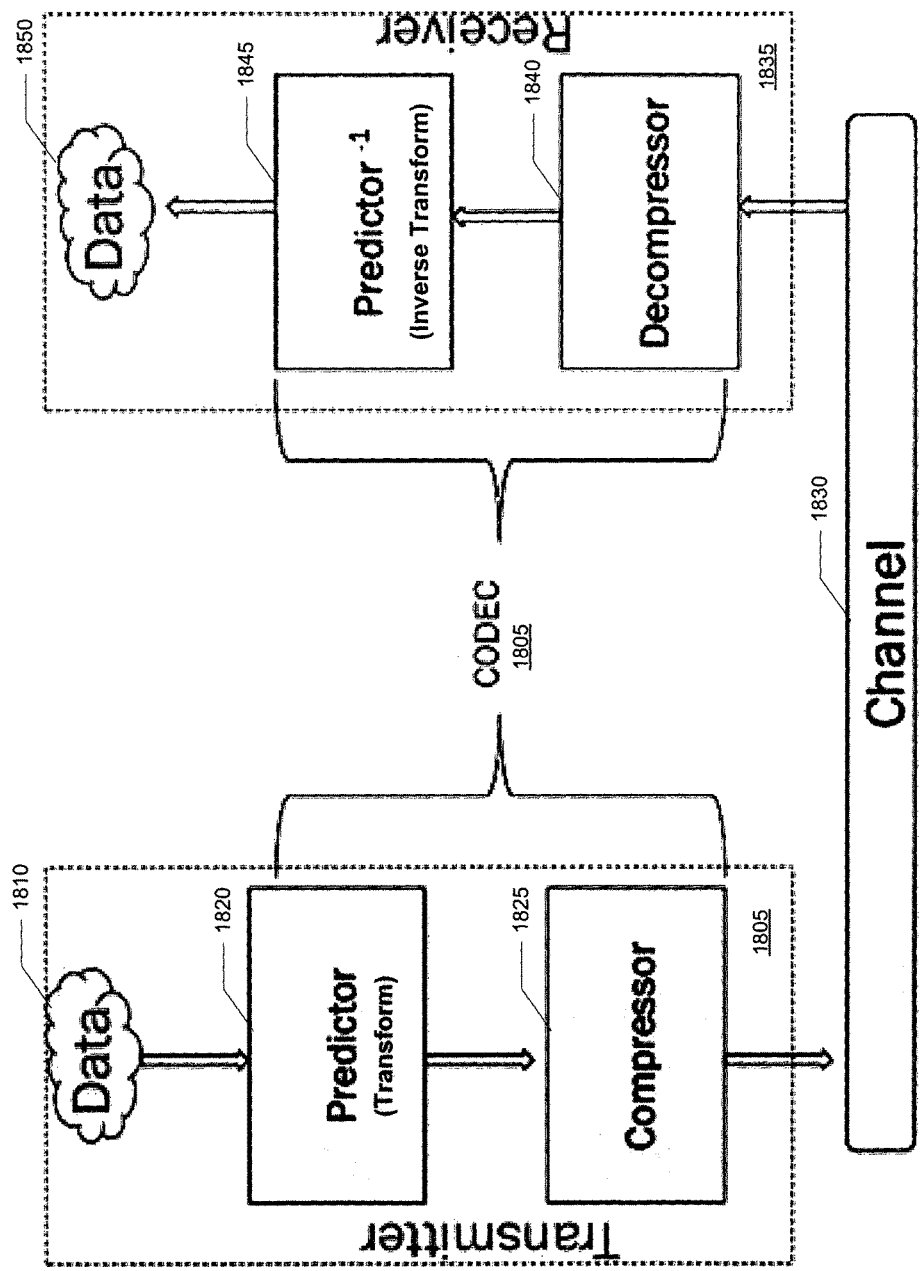
FIG. 18 shows an example of data transmission in accordance with some embodiments of the invention.

FIG. 18 shows at 1800 an example of data transmission in accordance with some embodiments of the invention. At a transmitter 1805, data 1810 are compressed using a codec 1815 with a transform 1820 and a compressor 1825. The resulting compressed data are passed via a channel 1830 to a receiver 1835, where they are decompressed using the same codec 1815 with a decompressor 1840 and inverse transform 1845 to obtain restored data 1850.

Figure 19:
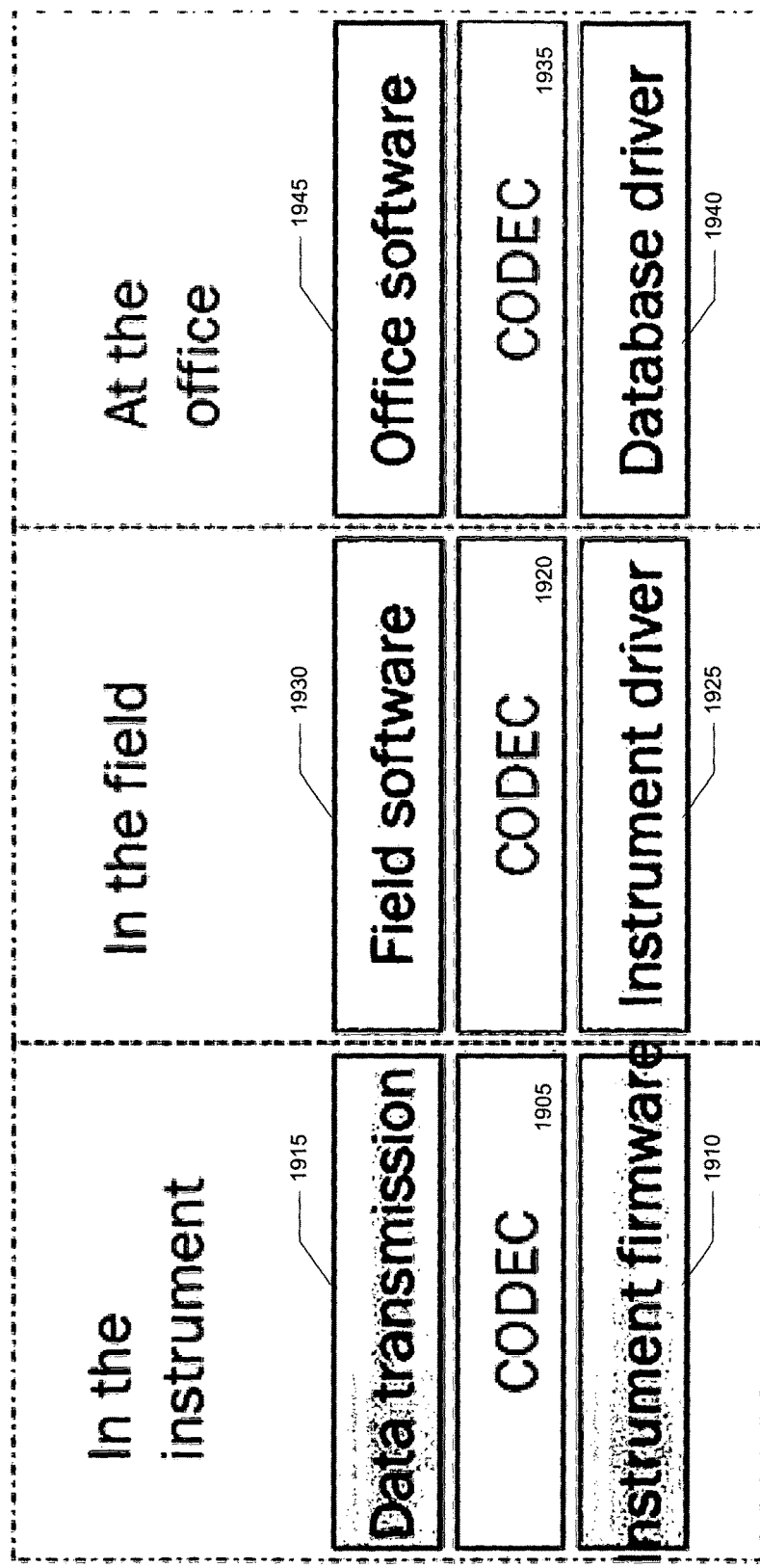
FIG. 19 shows an example of software architecture in accordance with some, embodiments of the invention.

Channel 1830 can take many forms, such as:
Streaming between a measurement instrument and a field software process
Network transfer between a database server and an office software process
Bus transfer to a hard drive for storage of project data FIG. 19 shows at 1900 an example of software architecture in accordance with some embodiments of the invention.
Codecs can be changed
The same codec is used for all applications for a given data chunk [the codec id is encoded into the data chunk, so different data chunks can have different codecs, and thus a given application can use different codecs for different data chunks]

In a measurement instrument, such as a scanner, a codec 1905 is used to compress data received from instrument firmware 1910 for data transmission 1915. In the field, a codec 1920 is used to decompress data received from instrument driver 1925 for use in field software 1930. At the office, a codec 1935 is used to decompress data from a database driver 1940 for use in office software 1945.

Data structures in accordance with some embodiments provide a simple file recovery mechanism. Each patch is stored with a header identifying the type of patch (distance, angle, intensity, etc.), the codec needed to decompress it, the exact size of the chunk to read from the hard drive, and its coordinates in the whole scene.

For billion-point files the number of patches can make it cumbersome to read all the headers to find a particular patch. In accordance with some embodiments of the invention a lookup table for the scanned scene is created when all patches have been collected. If for example the scanner loses battery power before completing the scan, there is no lookup table. In this case, a file recovery mechanism can recover what had been scanned by reading the packet headers to create a repaired file with lookup table and with previews. Previews can be constructed as points are acquired, but they need not be stored until the scan is complete.

Some of the key advantages of file formats in accordance with some embodiments of the invention include one or more of the following:
Allows real-time file creation (no post-processing)
Easy to add any number of further component types (time stamp, color information, 16-bits luminance, etc.)
Header cost is less than 1:1000 of total file size
Easy and versatile versioning at the header level FIG. 20 illustrates at 2000 an example of a cloud of 3D points 2005 displayed in a grid structure having a vertical axis $VA \in [0,\pi]$ and a horizontal axis $HA \in [0,2\pi]$ in accordance with some embodiments of the invention. The display of FIG. 20 is comparable to that of FIG. 2, but adds a representative grid overlay to schematically illustrate the intended file structure in which the 3D points are to be recorded and to aid in describing the "two faces" issue encountered when creating a file from real-time point data streamed from a scanner.

Figures 21A, 21B:
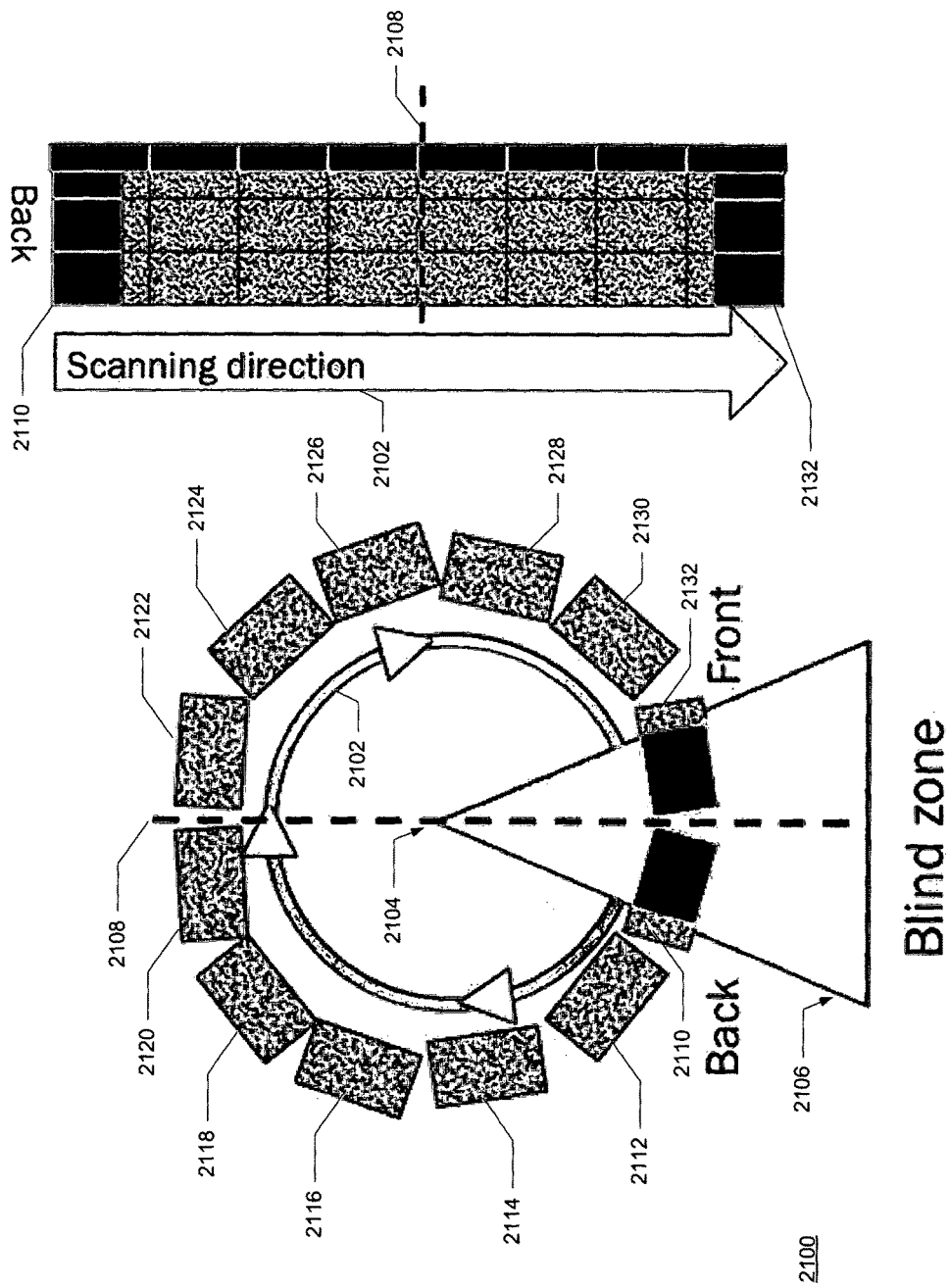
FIG. 21A schematically illustrates the data acquisition of a rotating scanner head.
FIG. 21B schematically illustrates the structure of data acquired with a rotating scanner head.

FIG. 21A and FIG. 21B schematically illustrate the "two faces" issue with a scanner having a rotating scan head such as the typical scanner shown at 105 in FIG. 1.

As shown in FIG. 21A, the scan head rotates continuously as depicted by arrowed circle 2102, about an axis seen as a point 2104. A blind zone 2106 is due to the base of the scanner. A plumb line 2108 demarks the transition from the backside (face 1) scan to the frontside (face 2) scan. Scanning proceeds with increasing vertical angle (VA) up the back side of the scanner from the nadir to the zenith of the rotation as depicted by blocks 2110, 2112, 2114, 2116, 2118 and 2120, then proceeds down the front side of the scanner with decreasing vertical angle (VA) from the zenith to the nadir of the rotation as depicted by blocks 2122, 2124, 2126, 2128, 2130 and 2132. The scan head also rotates about the plumb axis 2108 with incremented horizontal angle (HA) so as to acquire a cloud of three-dimensional point measurements about two axes of rotation.

Thus, the scan head rotates about two axes, scanning circles with a first face (backside) and a second face (frontside).

Scanner data are acquired as the scan head is going up on one face (face 1) to the zenith and then down on the other face (face 2). If the data were displayed in the order acquired, the frontside and backside scan data would be side by side, with the frontside (face 2) data beside the backside (face 1) data but spaced 180 degrees apart, as shown in FIG. 21B.

The scanner acquires data 0-360 degrees in the vertical direction at high speed and 0-180 degrees in the horizontal direction, while the user expects to see 0-180 in the vertical direction and 0-360 degrees in the horizontal. The scanner can be considered as scanning in "portrait" format, while the user would expect the data to be arranged in "landscape" format.

Some embodiments in accordance with the invention project the acquired scan data into a grid such that it corresponds to the user's expectation: the frontside (face 2) image is projected into the grid inverted 180 degrees and advanced 180 degrees from the corresponding backside (face 1) image.

Figure 22:
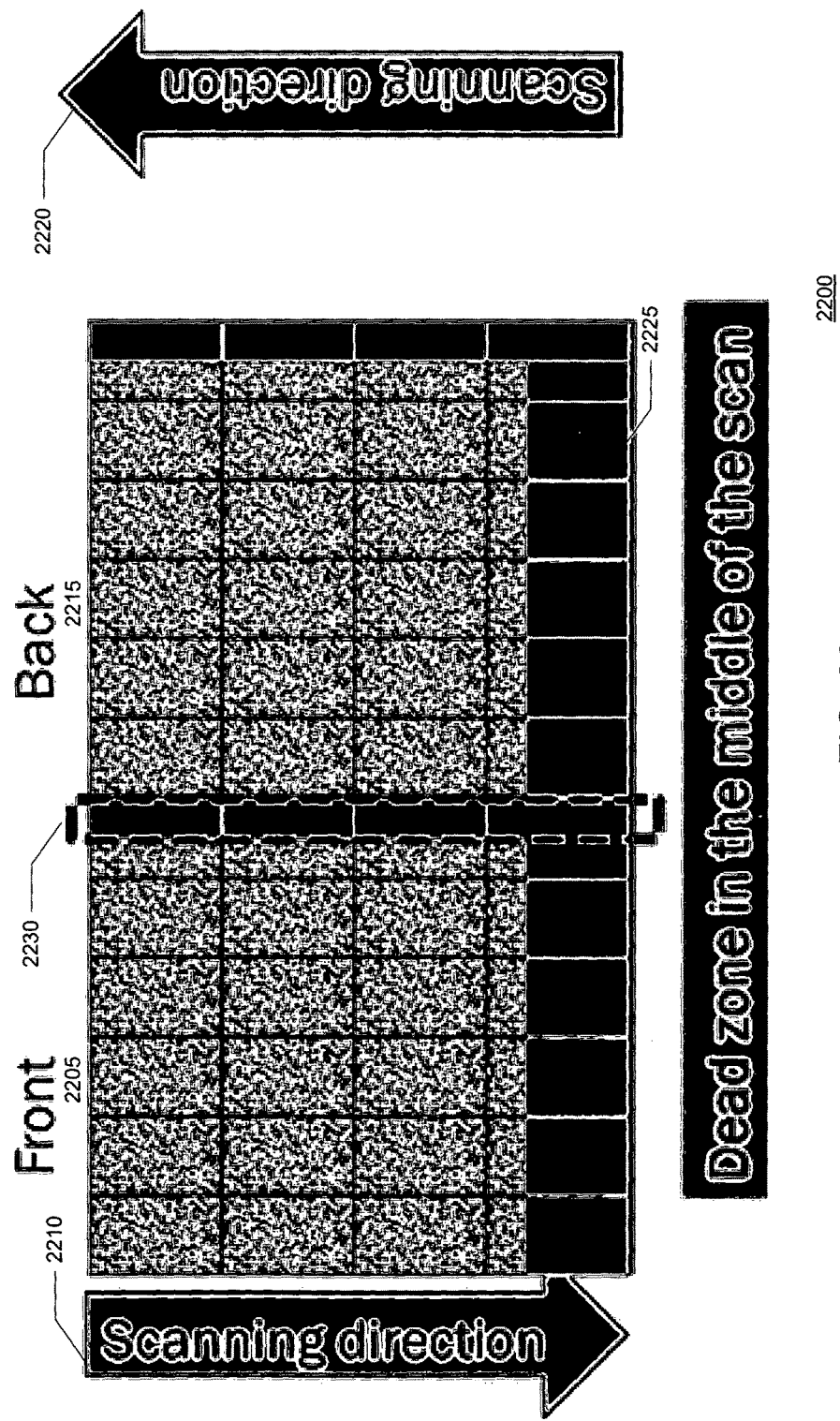
FIG. 22 shows a grid data structure after face separation and reordering in accordance with some embodiments of the invention.

FIG. 22 shows at 2200 an example of a grid data structure after face separation and reordering. Blocks 2205 on the left side represent the face 2 data scanned from zenith to nadir as shown by scanning direction arrow 2210. Blocks 2215 on the right side represent the face 1 data scanned from nadir to zenith as shown by scanning direction arrow 2220. The blind zone is represented by black regions of the blocks along the bottom of the grid as indicated at 2225. A dead zone in the middle of the scan data is indicated by column 2230: the scanner scans a front line top to bottom which continues on the back side from bottom to top but 180 degrees horizontally displaced. Patches are filled one column at a time.

When a column is filled, it is sent for compression and storage. This works when number of lines of scans is a perfect multiple of patch width. When this is not true (the general case), the result is an incomplete patch in the middle of the picture. If scan lines are just accumulated one after another there is no way to know in advance how many scan lines will result. A consequence of this is unfilled columns of cells in a column of patches.

In some embodiments, this is compensated by projecting lines into the intersection column 2230. Thus there are three sets of patches: one for front face (2205), one for back face (2215), and one for the intersection in the middle of the picture (2230). The middle column 2230 of patches will have some frontside data and some backside data. In the general case, the 180-degree boundary between the frontside lines and backside lines falls somewhere in a column of patches in the middle set 2230. This is only an issue for data acquisition during real-time scanning. When working offline, such as for conversion of an existing stored scan data set, the scan structure can be determined before conversion of the data to a layered grid structure in accordance with an embodiment of the invention and the 180-degree boundary problem can be avoided.

In some embodiments, scanning starts with a line in face 1, then an inverted line in face 2. The face 2 line goes into a column which is somewhere in the middle of a column of face 2 patches. A column of face 2 patches is buffered until the last line is acquired, then those patches are passed for compression and storage.

In one example, a scanner head rotates at 60 rpm and with good motor control acquires 30,000 scan lines. One approach to populating a grid with scan data is to have scan line 1 followed by scan line 2, etc., in sequence. But if there is drift, e.g., the scan head slows or stops, then the accumulated lines do not correspond to the grid. In this case data would be shifted in the grid and the grid would not correspond to the scanned angles.

When scanning starts and face 2 data is to be projected into the grid as 180 degrees advanced from face 1 data, a problem is presented because the exact number of scan lines would have to be known, yet an exact number cannot be assumed because of imperfect motor control. Also, the exact number of lines scanned is not a power of two. Thus a patch could be incomplete at one side and at the bottom, a kind of dead zone.

In accordance with some embodiments of the invention, if a line is scanned twice because the scanner motor not turning fast enough, scan data for some points are discarded to avoid distorting the grid. If a line is missed because the scanner motor turns too fast, some grid cells are not populated but are left empty. That is, the scan data is adapted to the grid, while the grid remains strictly fixed. In either case (too many lines or too few lines), the acquired point data are assigned to the correct cell of the grid.

In some embodiments, this same strategy is used when converting from other formats to TZF, projecting line by line. A difference with conversion of data from other formats (versus real-time scan data acquisition) is that there can be more unknowns but more processing power available. The central concept however is that of projecting the line.

In contrast, prior art approaches required a complex process to correct the grid in post-processing.

Embodiments in accordance with the invention populate an almost strict grid (some pixels can be correctly ordered but might be in an adjacent cell; the order of scan is respect but, due to instrument errors, the data could be off) which avoids the need for later grid correction. Even if some points are not projected exactly into the grid, some averaging can be done in the middle of a line. This can be determined line by line rather than point by point.

Populating the grid in this manner as the data are acquired can be seen as "on-the-fly correction" or "scan to grid" operation, requiring little processing power when the data are acquired and no post-processing is performed for grid-correction.

Figure 23:
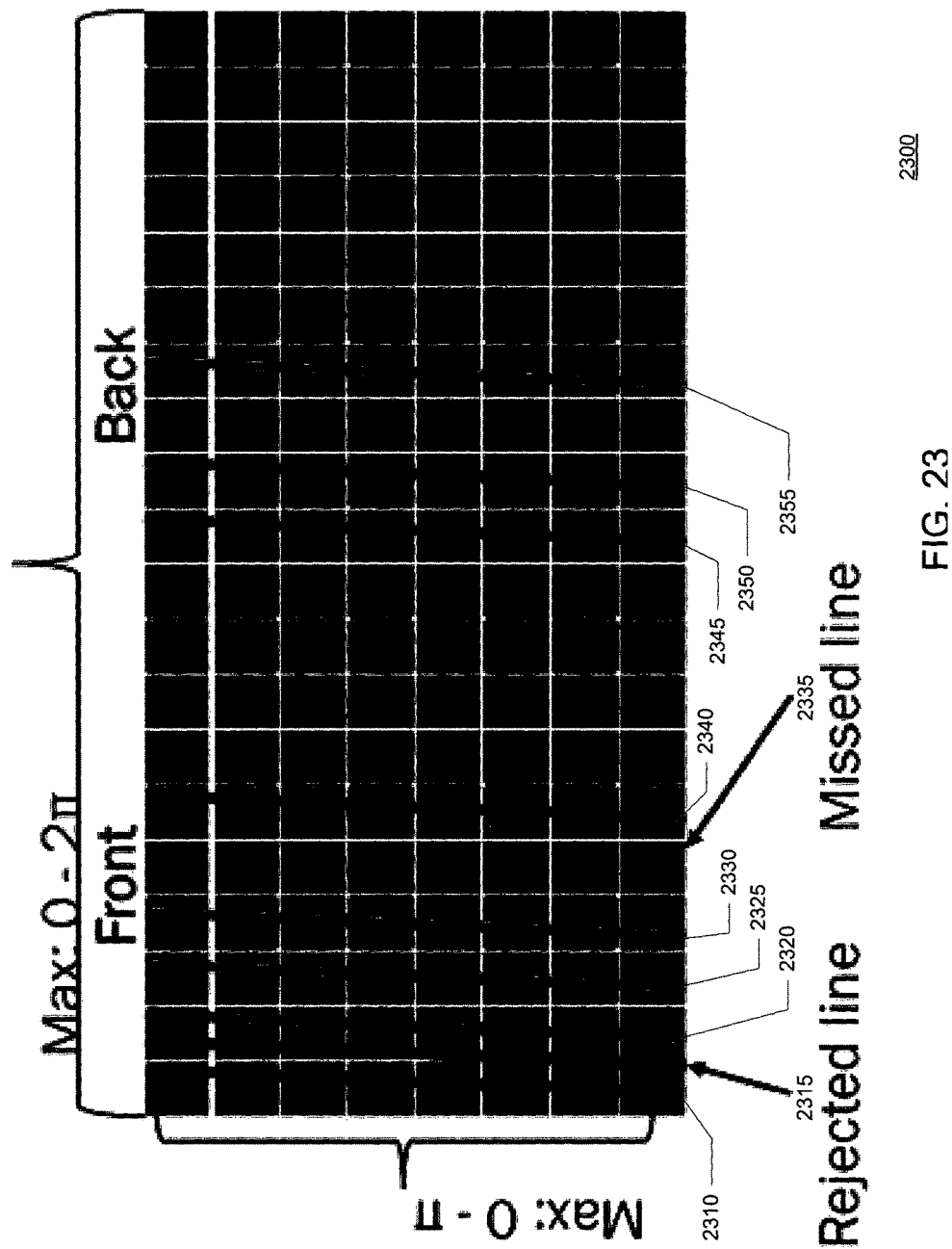
FIG. 23 shows an example of "scan to grid" operation in accordance with some embodiments of the invention.

FIG. 23 shows an example of "scan to grid" operation. A line 2310 is acquired and its data are placed in cells of the first (left-hand) column of the grid corresponding to the VA and HA values of its measured points. A line 2315 is acquired having values which cross over the boundary between the first column and the adjacent column; line 2315 is rejected as it does not conform to the strict grid requirement. As lines 2320, 2325, 2330, 2340, 2345, 2350 and 2355 are acquired their data are placed in the columns and cells of the grid corresponding to the VA and HA values of their measured points. Column 2335 remains empty as no line of data is acquired which corresponds to its grid coordinates. Despite the rejected line 2315 and the column 2335 missing a line of point data, the strict grid structure is maintained and the data which populates its cells are correctly positioned for each measured point.

The scanner knows where it starts to scan: that is, the top left (start of scan) angles VA and HA for the grid are known. The width and height of the grid are generally known as scanner parameters. The number of cells is not known exactly, due to imperfect motor control, but is approximated by calculation. Though the number of scan lines and number of columns of the scan are unknown, strict adherence to the grid structure (rejecting lines or allowing for missing lines) avoids distortion of the grid. This allows the creation of face 2 patches as their data are acquired; the patches can be populated in any desired order as the data become available. The patches can be stored as they are completed and retrieved in any arbitrary order. A consequence of this is that the potential black zone 2830 is avoided.

By projecting each scan line into the grid, acquired data are corrected as received from the scanner, regardless of the type of scan (e.g., static, vehicle mounted, airborne) or the type of instrument used (line scan data such as a Trimble Gx, point scan data such as a Trimble Vx, or other [explain?]). This technique is also well suited to converting an existing data set to create a perfect grid from an imperfect point cloud data set and compress it to reduce the file size, since the grid parameters are defined to accomodate any type of point from any point cloud.

To create a data set in accordance with some embodiments of the invention

Each point is represented by multiple components,
Each point corresponds to a cell of a grid defined by predetermined parameters (e.g., scanner angles)
Each component corresponds to a grid layer,
Each grid layer is divided into patches of cells,
Each point is projected into a cell by distributing its components into the respective grid layer,
Each patch is processed as a component "image" (a two-dimensional grid of contiguous cells containing information for one component)

Figure 24:
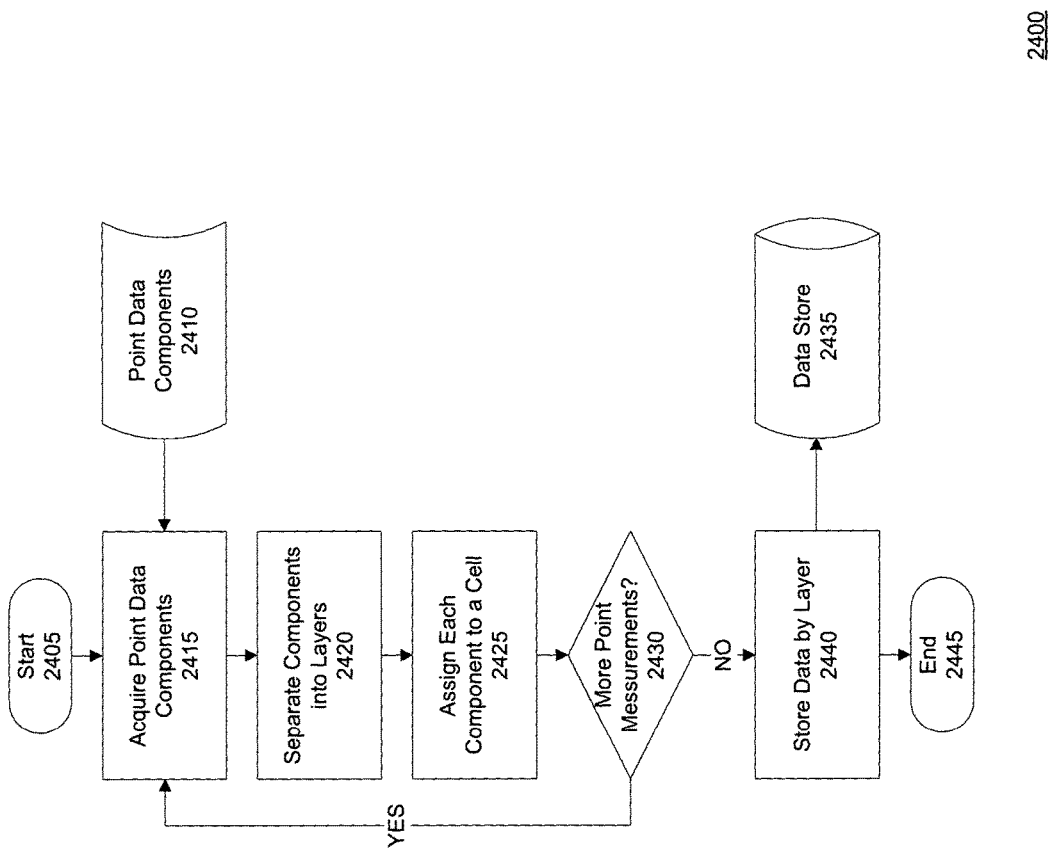
FIG. 24 shows a process for preparing a data set in accordance with some embodiments of the invention.

FIG. 24 shows at 2400 a process for preparing a data set in accordance with some embodiments of the invention. The process starts at 2405. Point data components 2410 are acquired at 2415, e.g., from a scanner or from a stored data file. The point data components are separated into layers at 2420, e.g. one layer per component of a point measurement. At 2425, each component of the point measurement is assigned to a cell of a grid layer corresponding to the component. At 2430, the process repeats for additional points. At 2440, the data are stored by grid layer, e.g., in a data store 2435. The process ends at 2445 when all point measurements of the data set have been prepared.

FIG. 25 shows at 2500 a detailed configuration of step 2440 in accordance with some embodiments of the invention. At 2505, each grid layer is segmented into patches of cells. As each patch of cells is populated, its layers are compressed at 2510 using for each layer a codec associated with the component represented by the layer. At 2515 the compressed patches are passed to data store 2435.

Those of ordinary skill in the art will realize that the detailed description of embodiments of the present invention is illustrative only and is not intended to be in any way limiting.

In the interest of clarity, not all of the routine features of the implementations described herein are shown and described. It will be appreciated that in the development of any such actual implementation, numerous implementation-specific decisions must be made to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with embodiments of the present invention, the components, process steps and/or data structures may be implemented using various types of operating systems (OS), computer platforms, firmware, computer programs, computer languages and/or general-purpose machines. The methods can be run as a programmed process running on processing circuitry. The processing circuitry can take the form of numerous combinations of processors and operating systems, or a stand-alone device. The processes can be implemented as instructions executed by such hardware, by hardware alone, or by any combination thereof. The software may be stored on a program storage device readable by a machine. Computational elements can be implemented using an object-oriented programming language such that each required element is instantiated as needed.

Those of skill in the art will recognize that devices of a less general-purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

Methods in accordance with some embodiments may be implemented on a data processing computer such as a personal computer, workstation computer, mainframe computer, or high-performance server running an OS such as a version of Microsoft® Windows® available from Microsoft Corporation of Redmond, Wash., or various versions of the Unix operating system such as Linux available from a number of vendors. The methods may also be implemented on a multiple-processor system, or in a computing environment including various peripherals such as input devices, output devices, displays, pointing devices, memories, storage devices, media interfaces for transferring data to and from the processor(s), and the like. Such a computer system or computing environment may be networked locally, or over the Internet.

Any of the above-described methods and their embodiments may be implemented by means of a computer program. The computer program may be loaded in an apparatus having a processor, such as a scanner or total station with scanning capability. Therefore, the invention also relates to a computer program which can enable a processor to carry out any one of the described methods and their embodiments.

The invention also relates to a computer-readable medium or a computer-program product including the above-mentioned computer program. The computer-readable medium or computer-program product may for instance be a magnetic tape, an optical memory disk, a magnetic disk, a magneto-optical disk, a CD ROM, a DVD, a CD, a flash memory unit or the like, wherein the computer program is permanently or temporarily stored. The invention also relates to a computer-readable medium (or to a computer-program product) having computer-executable instructions for carrying out any one of the methods of the invention.

The invention also relates to a firmware update adapted to be installed on devices already in the field, i.e. a computer program which is delivered to the field as a computer program product.

The constituent parts of a unit may be distributed in different software or hardware components or devices for bringing about the intended function. Furthermore, the units may be gathered together for performing their functions by means of a combined, single unit Following is a summary of some of the inventive concepts described herein:

1. A method of processing data representing points in space, each point represented by at least three components defining its position in a non-Cartesian coordinate system and by at least one component defining a parameter of the point, comprising:
   a. for each point,
      i. separating the components into a respective layer per component, and
      ii. assigning each component to a cell of a two-dimensional grid of cells such that corresponding cells of multiple layers contain the components representing the point, and
   b. storing each layer,
   whereby a selected component of a point can be retrieved by reference to a grid position corresponding to the point and to a layer corresponding to the component.
2. The method of 1, wherein storing a layer comprises segmenting the layer into patches of cells such that a selected component of a point can be retrieved by reference to a grid position of a patch within a layer and to a grid position of a cell within a patch.
3. The method of 2, wherein storing a layer comprises compressing at least one patch of the layer by applying a codec associated with the layer.
4. The method of one of 1-3, wherein storing a layer comprises compressing at least a portion of the layer by applying a codec associated with the layer.
5. The method of one of 3-5, wherein the codec encodes a derivative of the component assigned to a cell.
6. The method of one of 3-5, wherein the codec associated with a layer comprises one of:
   i. A range codec associated with a layer representing range,
   ii. An angle codec associated with a layer representing angle,
   iii. An intensity codec associated with a layer representing intensity.
7. The method of one of 1-6, wherein the non-Cartesian coordinate system comprises a spherical coordinate system in which position of a point is defined by two angles about an origin and a range from the origin (e.g., spherical coordinates of a stationary scanner or total station).
8. The method of one of 1-6, wherein the non-Cartesian coordinate system comprises a swath coordinate system in which position of a point is defined by a longitudinal displacement along a path, a sweep angle across the path, and a range from a point along the path (e.g., "tubular" coordinates of a vehicle-mounted or aerial scanner).
9. The method of one of 1-6, wherein the non-Cartesian coordinate system comprises time-based coordinates (e.g., a vehicle-mounted mobile scanner with one angle measurement, one range and a timestamp for each measurement: data can be stored by angle vs. time so that the timestamps can later be correlated with position formation from another source such as GNSS receiver data or an inertial navigation system; such a grid can have finite width but potentially infinite height).

10. The method of one of 1-6, wherein the non-Cartesian coordinate system comprises a continuously-increasing axis (as with time or longitudinal displacement along a path).

11. The method of one of 1-6, wherein the non-Cartesian coordinate system comprises a cyclically-increasing axis (as with rotation angles).

12. The method of one of 1-11, wherein each dimension of the two-dimensional grid of cells is related to at least one component.

13. The method of 12, wherein each dimension is an angle in a spherical coordinate system (e.g., as for a stationary scanner or total station).

14. The method of 12, wherein one dimension is a path position and one dimension is a scan angle (e.g., as for a mobile scanner).

15. The method of 12, wherein one dimension is a path position and one dimension is a lateral displacement (e.g., as for a planar scanner or aerial scanner).

16. The method of one of 1-15, wherein the components represent a horizontal angle, a vertical angle, a range and at least one of intensity and color.

17. The method of one of claims 1-16, wherein at least one of the components represents one of:
 a. an additional range (e.g., as a multi-pulse scanner in aerial scanning),
 b. a time stamp,
 c. scanner tilt information (e.g., for use in post-processing correction),
 d. measurement quality (e.g., a confidence level of measurement).

18. The method of one of 1-17, wherein the at least one component defining a parameter comprises at least one of:
 a. luminance,
 b. color,
 c. timestamp,
 d. derived values (e.g., a result of applying one or more algorithms to measurement data)

19. The method of one of 1-18, wherein storing the layers comprises storing the data in a relational database.

20. The method of one of 1-19, wherein storing the layers comprises storing the data in a file-based system.

21. The method of 20, wherein the file-based system comprises main headers, patch data fields, and patch lookup tables (FIG. 11).

22. The method of one of 20-21, wherein the file-based system comprises data previews (FIG. 11).

23. The method of one of 20-22, wherein the file-based system comprises an entry point structure with main headers accessible by pointers (FIG. 12A).

24. The method of one of 20-23, wherein the file-based system is structured as a chain of data chunks, each data chunk having a header defining its parameters, and wherein storing the layers comprises storing the data chunks in an arbitrary order (FIG. 13).

25. The method of one of 1-24, further comprising transmitting the data over a transmission channel.

26. The method of 25, wherein the transmission channel comprises one of:
 a. a streaming link between an instrument acquiring data representing the components and a processor for further processing the data,
 b. a network link between a database server and a processor for further processing the data, and
 c. a bulk storage medium [e.g., a hard drive for project data storage].

27. The method of one of 1-26, wherein storing the layers comprises storing the data as data chunks in a chained structure comprising a main header with pointers to compressed data patches, a pointer to a patch lookup table, pointers to data previews, and a pointer to a preview lookup table.

28. The method of one of 1-27, wherein storing the layers comprises storing the data with an information header defining characteristics of a data set (e.g., rho precision, theta precision, phi precision, vertical step, horizontal step, first vertical angle, first horizontal angle, number of lines, number of columns, size of patch, angle unit, distance unit; where precision is what is used to quantify the data—it is rounded to some precision—floating point values converted to integer values for easier compression, e.g., if measured value 123.456 is converted to 123.4 and multiply by 10 to get an integer value 1234 (if precision is 1 decimal place), the stored precision is 10).

29. The method of one of 1-28, further comprising a component header for each layer identifying a codec associated with the layer (e.g., first component header [rho header], a second component header [theta header], a third component header [phi header], a fourth component header [luminance])

30. The method of one of 1-29, further comprising generating at least one derivative component layer (e.g., normals).

31. The method of one of 1-30, further comprising processing the layers as component images to generate patches of a derived grid layer from patches of at least one other grid layer (e.g., user-selected patches stored for future purpose, or a result of a processing-intensive computation such as fitting image elements to points or a data flag indicating if a point belongs to a feature such as a pipe, a wall, a special target, a piece of industrial plant equipment such as a pump).

32. The method of one of 1-31, wherein each patch of cells of a grid layer is a contiguous array.

33. The method of one of 1-32, wherein each patch of cells comprises an array of 2"×2" cells where n is a value between 7 and 10 (e.g., a value of n=7 provides smaller packet data transfer of patches, n=8→256×256→~50,000 points→~250 Kbyte uncompressed, n=9→512×512→~200,000 points→~1 Mbyte uncompressed).

34. The method of one of 1-33, wherein processing a patch comprises applying a compression algorithm to obtain a compressed patch.

35. The method of one of 1-34, wherein a compression algorithm applied to data of each grid layer is specific to the grid layer.

36. The method of one of 1-35, wherein at least one grid layer is compressed using a lossy image compression algorithm.

37. The method of 36, wherein the lossy image compression algorithm comprises one of jpeg and jpeg2000.

38. The method of one of 1-37, wherein at least one grid layer is compressed using a lossless data compression algorithm.

39. The method of 38, wherein the lossless data compression algorithm comprises one of zlib and lzma.

40. The method of one of 1-39, wherein processing each patch comprises:
 a. reordering data elements of the patch, b. computing a derivative of the reordered data elements, and c. applying a lossless data compression algorithm.

41. The method of one of 1-40, further comprising retrieving selected data by grid layer (e.g., component of interest).

42. The method of one of 1-41, further comprising retrieving selected data by patch or group of patches (e.g., region of interest).

43. The method of one of 1-42, wherein the data are compressed in self-contained patches, and further comprising retrieving and decompressing each self-contained patch separately (e.g., using information in the patch header about how to decompress—e.g., which codec to use).

44. The method of 43 wherein each patch is compressed and decompressed using the same codec.

45. The method of one of 43-44, wherein the data are reordered before compression and after decompression.

46. The method of 45, further comprising computing a derivative of the reordered data before compression.

47. The method of 46, further comprising computing an inversion of the derivative after decompression.

48. The method of one of 1-47, wherein the data are quantized before compression.

49. The method of 48, further comprising applying a scale factor to the data after decompression.

50. The method of one of 1-49, comprising transferring the layers as patches of data (compressed or uncompressed, reordered or not reordered, scaled or not scaled), wherein each patch includes patch header data making the patch self-contained.

51. The method of 50, wherein the transferring is performed with a granularity of one patch.

52. The method of one of 1-51, wherein data stored in at least one layer is more sparse than data stored in another layer (e.g., not all cells of a layer are populated with data).

53. The method of 52, where data stored in at least one layer comprises pixel data of a camera image.

54. The method of one of 1-53, wherein each data preview comprises a subset of data from multiple patches ((e.g., reduced resolution composite of multiple patches, as in FIG. 17A & FIG. 17B).

55. The method of 54, further comprising using a data preview of each of a plurality of layers to create a display (e.g., combine angle and distance previews to quickly display whole scene with low resolution).

56. Apparatus comprising a processor and a storage element with instructions that enable the processor to perform a method according to any one of 1-55.

57. A computer program comprising a set of instructions adapted to enable a processor to perform a method according to any one of 1-55.

58. A computer program product comprising a tangible medium on which is embodied a set of instructions adapted to enable a processor to perform a method according to any one of 1-55.

The invention claimed is:

1. A method of organizing point cloud data in a data structure, the point cloud data including a plurality of three-dimensional points in space, each three-dimensional point represented by three non-Cartesian coordinates including a horizontal angle, a vertical angle, and a range, each respective three-dimensional point associated with at least one parameter component defining a parameter of the respective three-dimensional point, the method comprising:

for each respective three-dimensional point:

separating the horizontal angle, the vertical angle, the range, and the at least one parameter component into at least four layers, wherein a first layer corresponds to the horizontal angle, a second layer corresponds to the vertical angle, a third layer corresponds to the range, and a fourth layer corresponds to the at least one parameter component; and for each respective layer of the at least four layers, assigning a corresponding one of the horizontal angle, the vertical angle, the range, and the at least one parameter component to a respective cell of a two-dimensional grid of cells; and storing each respective layer of the at least four layers in a computer storage medium;

whereby a selected one of the three non-Cartesian coordinates or the at least one parameter component of a selected three-dimensional point is retrieved by reference to a respective cell of the two-dimensional grid corresponding to the selected three-dimensional point and to a corresponding layer.

2. The method of claim 1, wherein storing each respective layer comprises segmenting the respective layer into patches of cells such that a selected one of the three non-Cartesian coordinates or the at least one parameter component of a three-dimensional point can be retrieved by reference to a corresponding cell of a corresponding patch within the respective layer.

3. The method of claim 2, wherein storing each respective layer comprises compressing at least one patch of the respective layer by applying a codec associated with the respective layer.

4. The method of claim 2, further comprising processing each patch by:

reordering data elements of the patch, computing a derivative of the reordered data elements, and applying a lossless data compression algorithm.

5. The method of claim 4, wherein the data elements are compressed in self-contained patches, and further comprising retrieving and decompressing each self-contained patch separately.

6. The method of claim 4, wherein the data elements are quantized before compression.

7. The method of claim 2, further comprising transferring each respective layer as patches of data, wherein each patch includes patch header data making the patch self-contained.

8. The method of claim 2, wherein a data preview comprises a subset of data from multiple patches.

9. The method of claim 1, wherein each dimension of the two-dimensional grid of cells relates to one of the three non-Cartesian coordinates.

10. The method of claim 1, wherein the at least one parameter component comprises at least two parameter components, and one of the at least two parameter components represents one of:

an additional range, a time stamp, scanner tilt information, or measurement quality.

11. The method of claim 1, wherein the at least one parameter component comprises at least one of:

luminance, color, timestamp, or derived values.

12. The method of claim 1, wherein storing each respective layer comprises storing the respective layer in a file-based system.

13. The method of claim 1, further comprising transmitting each respective layer over a transmission channel.

14. The method of claim 1, wherein storing each respective layer comprises storing the respective layer as data chunks in a chained structure comprising a main header with pointers to compressed data patches, a pointer to a patch lookup table, pointers to data previews, and a pointer to a preview lookup table.

15. The method of claim 1, wherein at least one of the at least four layers is compressed using a lossy image compression algorithm.

16. The method of claim 1, wherein data stored in at least one layer is more sparse than data stored in another layer.

17. The method of claim 1, wherein a first dimension of the two-dimensional grid of cells relates to the horizontal angle, and a second dimension of the two-dimensional grid of cells relates to the vertical angle.

18. A system comprising:
a processor; and
a storage element with instructions that enable the processor to perform a method of organizing point cloud data in a data structure, the point cloud data including a plurality of three-dimensional points in space, each three-dimensional point represented by three non-Cartesian coordinates including a horizontal angle, a vertical angle, and a range, each respective three-dimensional point associated with at least one parameter component defining a parameter of the respective three-dimensional point, the method comprising:
for each respective three-dimensional point:
separating the horizontal angle, the vertical angle, the range, and the at least one parameter component into at least four layers, wherein a first layer corresponds to the horizontal angle, a second layer corresponds to the vertical angle, a third layer corresponds to the range, and a fourth layer corresponds to the at least one parameter component; and
for each respective layer of the at least four layers, assigning a corresponding one of the horizontal angle, the vertical angle, the range, and the at least one parameter component to a respective cell of a two-dimensional grid of cells; and
storing each respective layer of the at least four layers in a computer storage medium;
whereby a selected one of the three non-Cartesian coordinates or the at least one parameter component of a selected three-dimensional point is retrieved by reference to a respective cell of the two-dimensional grid corresponding to the selected three-dimensional point and to a corresponding layer.

19. A non-transitory tangible computer storage medium on which is embodied a set of instructions adapted to enable a processor to perform a method of organizing point cloud data in a data structure, the point cloud data including a plurality of three-dimensional points in space, each three-dimensional point represented by three non-Cartesian coordinates including a horizontal angle, a vertical angle, and a range, each respective three-dimensional point associated with at least one parameter component defining a parameter of the respective three-dimensional point, the method comprising:
for each respective three-dimensional point:
separating the horizontal angle, the vertical angle, the range, and the at least one parameter component into at least four layers, wherein a first layer corresponds to the horizontal angle, a second layer corresponds to the vertical angle, a third layer corresponds to the range, and a fourth layer corresponds to the at least one parameter component; and
for each respective layer of the at least four layers, assigning a corresponding one of the horizontal angle, the vertical angle, the range, and the at least one parameter component to a respective cell of a two-dimensional grid of cells; and
storing each respective layer of the at least four layers in a computer storage medium;
whereby a selected one of the three non-Cartesian coordinates or the at least one parameter component of a selected three-dimensional point is retrieved by reference to a respective cell of the two-dimensional grid corresponding to the selected three-dimensional point and to a corresponding layer.

* * * * *